United States Patent [19]

Erdmann et al.

[11] 4,443,103
[45] Apr. 17, 1984

[54] RETRO-REFLECTIVE ELECTRO-OPTICAL ANGLE MEASURING SYSTEM

[75] Inventors: Joachim C. Erdmann, Seattle, Wash.; Robert I. Gellert, Quesnel, Canada

[73] Assignee: The Boeing Company, Seattle, Wash.

[21] Appl. No.: 481,041

[22] Filed: May 31, 1983

Related U.S. Application Data

[63] Continuation of Ser. No. 217,733, Dec. 18, 1980.

[51] Int. Cl.³ .................... G01B 11/26; G01C 21/06; G05B 1/00
[52] U.S. Cl. .................................. 356/152; 250/202; 356/150; 356/151
[58] Field of Search .............. 356/152, 151, 150, 141; 250/202

[56] References Cited

U.S. PATENT DOCUMENTS

| | | | |
|---|---|---|---|
| 3,443,108 | 5/1969 | Burmeister | 250/202 |
| 3,711,717 | 1/1973 | Rich et al. | 250/202 |
| 3,812,325 | 5/1974 | Schmidt | 235/467 |
| 3,865,483 | 2/1975 | Wojcik | 356/152 |
| 4,007,991 | 2/1977 | Robertsson | 356/141 |
| 4,045,140 | 8/1977 | Bumgardner | 356/152 |
| 4,227,807 | 10/1980 | Pond et al. | 356/152 |

*Primary Examiner*—S. C. Buczinski
*Attorney, Agent, or Firm*—Conrad O. Gardner; B. A. Donahue

[57] ABSTRACT

A scanning angle tracker which includes a laser beam and a beamsplitter for developing two beams which intersect on a scanning mirror. The scanning mirror sweeps the two beams across a retro-reflective tape on the object. Return signals are generated for processing to provide the desired angular information.

5 Claims, 32 Drawing Figures

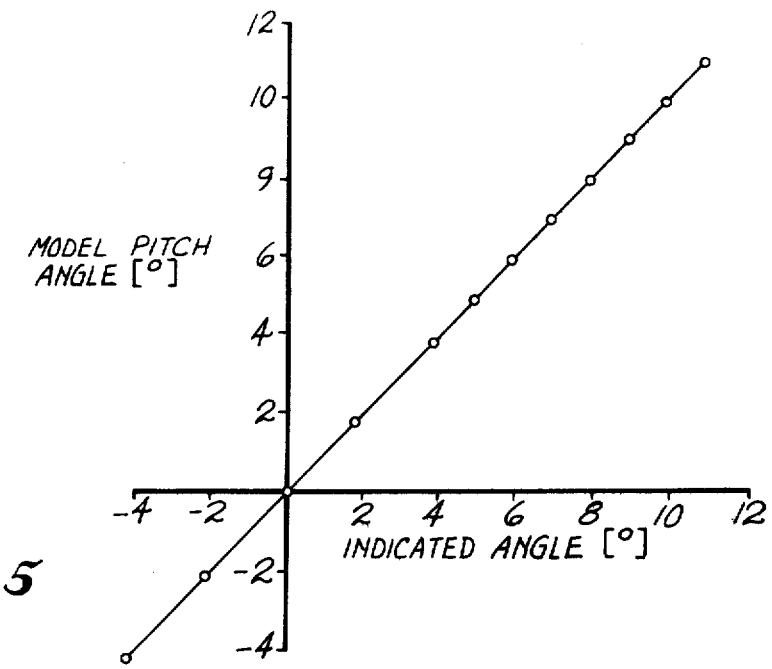
*Fig.* 5
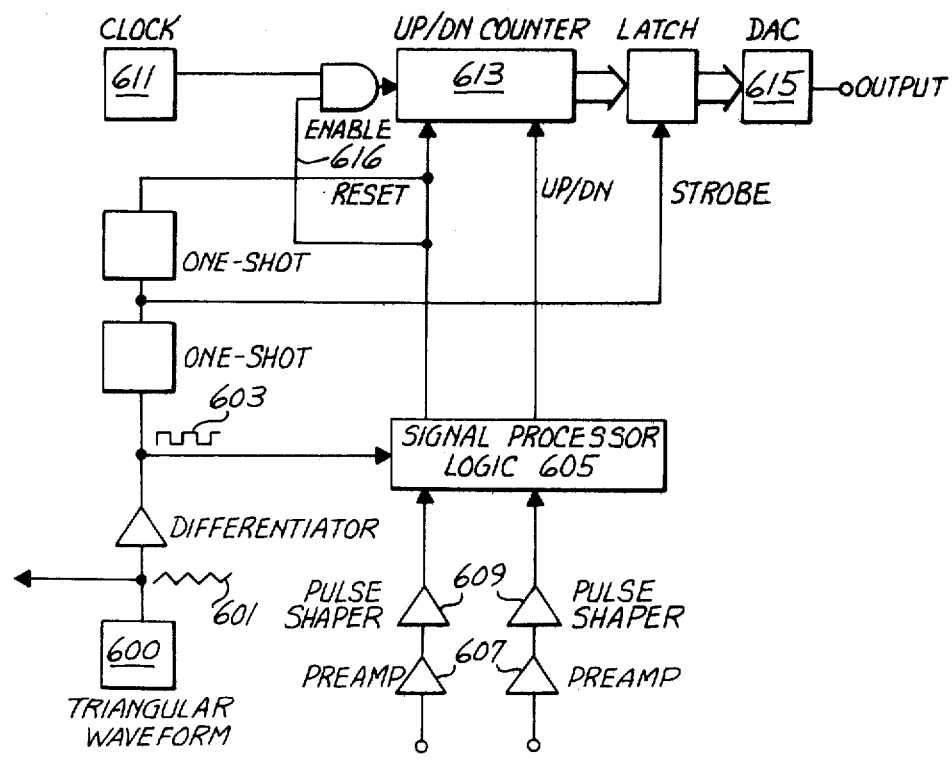
*Fig.* 6

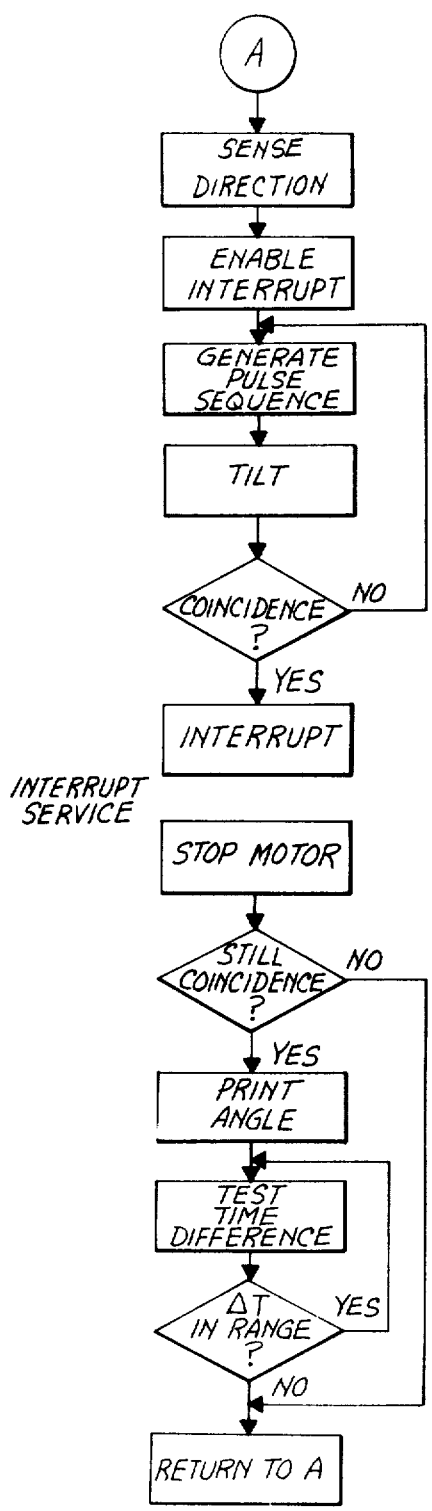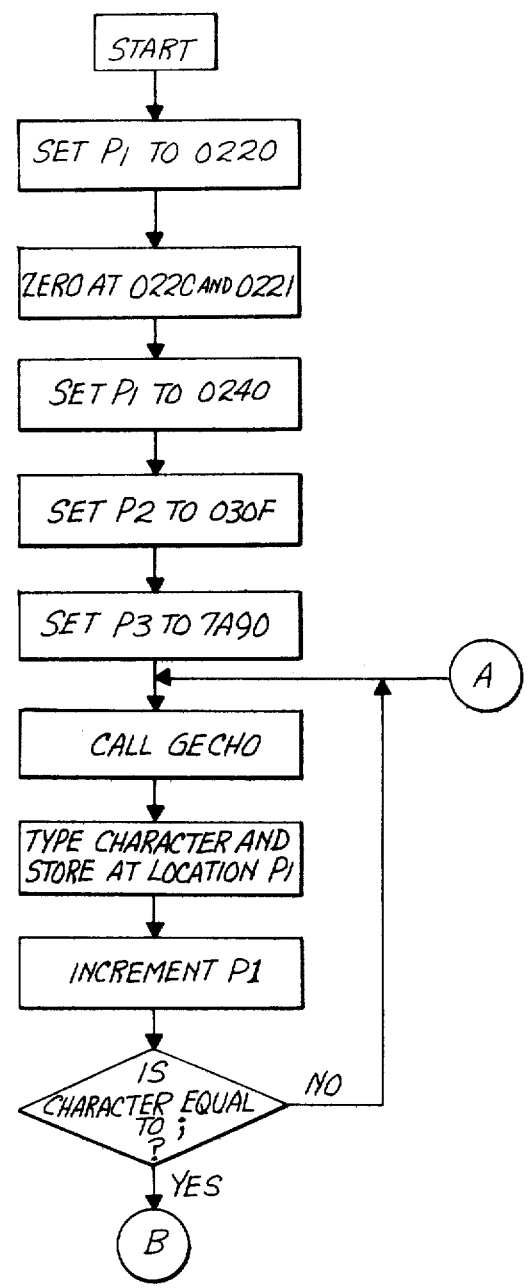
Fig. 17
Fig. 18

RETRO-REFLECTIVE ELECTRO-OPTICAL ANGLE MEASURING SYSTEM

This is a continuation, of application Ser. No. 217,733, filed Dec. 18, 1980.

The present invention relates to angle measuring systems and more particularly to a retro-reflective electro-optical type angle measuring system.

Heretofore angular changes have been measured utilizing interferometric systems whereas the present system measures absolute angle, therefore recovering the correct value upon signal interruption for a period of time. The present system provides non-contact measurement of angle in the range of zero degrees to 360 degrees with general precision of better than 0.1 degrees and to 0.01 degrees or better with precision exercise of the method.

The present method may be utilized for the measurement of angle of attack of wind tunnel models since it is insensitive to roll or yaw and since the correct angle is recovered after the passage of high turbulence or fog through the tunnel.

The present system may further be utilized in leveling or setting any angle on large structures such as buildings, bridges, and dams. Settling or shifting of heavy structures on soft foundations can also be monitored utilizing the present system.

Heretofore in measurement of angle of attack in wind tunnel, monitoring the angle obtained in the mechanical linkage between model and support (sting) has been utilized. Accuracy achieved has been high, e.g. 0.01 degrees through utilization of precise shaft encoders, but the elastic reactions in the sting have added uncertainty which require elimination by corrections made to the measured results. Such measurement technique is furthermore carried out as a means value measurement owing to the dynamic inertia of the mechanical and structural parts involved in the linkage.

Interferometric systems utilized in wind tunnels while providing precision of 0.01 to 0.001 degrees suffer drawbacks which include:

(1) a range limitation of approximately plus or minus forty-five degrees or less;

(2) measurements lost due to fog or other temporary signal loss mechanisms which are not recoverable;

(3) complicated fringe counting electronics for up-/down counting, thereby requiring good S/N ratio;

(4) great tolerance to high temperature turbulence which may be encountered in wind tunnels, thereby causing large errors in angle readout;

(5) limitation that state of the art angle sensors require viewing of the object from within the plane of the tilt angle, thereby representing the possibility of a difficult access problem in wind tunnels and on large structures, e.g. such a sensor must look down from the top of the wind tunnel onto the model and thus difficulties arise in the transportation and use of heavy equipment on top of the tunnel;

(6) the basic sensitivity of interferometry instruments is fixed by the fringe producing optics, i.e. sensitivity cannot be sacrificed in favor of improved S/N ratio during difficult measurements.

Objects, features, and advantages of the present retro-reflective electro-optical angle measuring system include the following:

(1) Absolute angle in one plane of orientation of a target object is established, the present system comprising an optical transmitter/receiver in line-of-sight contact with a target without requirement for focusing or imaging.

(2) The angle is measured on a follower or tracker that can assume the same orientation as the target object in the plane of projection in the viewing direction. Angle readout occurs by one or more of the following three modes: (a) optical encoder on the follower, or (b) number of pulses put into the stepping motor on the rotation stage of the follower as a function of the rotation angle, monitored by the microprocessor that controls the instrument, or (c) by measuring the angle deviation between target and follower.

(3) A measure $\Delta T$ for the angle deviation between target and follower is derived from the time difference between two optical signals returning after retro-reflection from an adhesive retro-reflectively coated mylar, a plastic film on the target.

(4) The measure $\Delta T$ can be calibrated in terms of the deviatory angle $\Delta \alpha$ and read out, if so desired, but its principal funtion is to provide a GO status of proper sign to rotate the follower. Rotation rates are programmable to suit varying applications.

(5) Feature (4) hereinabove enables a relationship between $\Delta T$ and $\Delta \alpha$ which is non-linear. This can be entirely ignored, however, if the orientation of the follower is kept parallel to the target.

(6) Another system feature is that fluctuations of the amplitude of the scanning mirror excursions and other dynamic imperfections have no influence on the measured orientation angle. Also of no influence is the time function of the scanning mirror which may be sinusoidal, for example, the underlying reason being that both scanning beams are moving always at exactly the same rate, and the final position of the follower is assumed when both optical signals return simultaneously.

(7) The operational function of the system is reversible: Instead of programming the follower by its microprocessor to orient itself parallel to the target projection, it can also be programmed to issue status signals with regard to the orientation of a target that is to be moved until it assumes exactly the preadjusted position of the follower. This flexibility in the present system allows for a variety of applications in the alignment of structural members in construction work.

(8) Accuracy is limited by the following characteristics: (a) internal clock rate that fixes the time unit of measuring $\Delta T$, (b) angle-of-arrival fluctuations of the returning optical signal wavefronts, affected by the air turbulence between follower and target, and (c) unknown angle corrections which may sometimes enter through the relations between the target contour under the retro-reflective strip and its plane projection in the viewing direction.

Representative prior art includes U.S. Pat. No. 3,893,772 which incorporates some of the features enumerated hereinabove in (3); however, only one beam is utilized. Measurement of the angle follows the option under (4) which is not the principle in the present device. The precision of the device in the referenced U.S. Pat. No. 3,893,772 is, therefore, affected by the required calibration between time position and angle. There is no such requirement in the present system. The derived angle information, as obtained in the referenced patent system, is acquired in general only once in each pass of the aircraft, because the reflected beam intercepts the detector under conditions that exist only for one (or possibly several) short time interval(s). This is the consequence of using a reflector that is retro-reflective in a vertical plane and symmetrically reflective in a horizontal plane. In the present system, the reflector on the target is retro-reflective in any plane so that there is always optical contact between target and receiver.

A further representative prior art patent literature reference, the device shown in U.S. Pat. No. 3,865,483 shows comparison of optical information in two channels. In contrast to feature (1) hereinabove of the present system, imaging is required in the referenced patent. Alignment is established, not by a specific angle measurement, but by comparison of alignment targets. The incident beam is not serially applied (by a scanning mechanism), but in parallel (illuminations of an extended area). Hence, in most respects the device of the referenced patent is very dissimilar from the present system in both purpose and design.

In the system shown in U.S. Pat. No. 3,633,212 plane-polarized light must be used, and the angle information is acquired from the rotation of the plane of polarization after reflection from a bank of polarizing reflectors. There is no particular similarity seen with the present instrument. The precision of orientation measurements in the referenced system appears to be limited by the perfection of the required polarizing components.

U.S. Pat. No. 4,030,830 shows a device employing a light-deflecting Bragg cell for scanning of a rough surface. Principles of laser speckle metrology are than applied to derive information on the surface roughness. Use of a Bragg cell for deflection of a laser beam is a further possible mode in the present system. The choice of whether Bragg cells, vibrating mirrors or rotating polygonial mirrors are used for beam deflection is usually dictated by requirements of slew rate, deflection amplitude and cost. In other respects, the purpose and design of the referenced device is quite dissimilar from the present system hereinafter described.

The purpose and design of the system of U.S. Pat. No. 3,796,497 is similar to the system of U.S. Pat. No. 4,865,483, except that rotating mirrors are employed for a serial readout of information from which the alignment status can be determined.

In summary, the hereinabove referenced patent literature systems do utilize light-transmitting and receiving techniques having some resemblance to the present system. However, in this regard it should be noted that there are only a few principles which can be utilized to collect optical information, and these are basically of three types, viz. imaging, Fourier-transformation by diffraction related techniques such as speckle metrology, and scanning. Only the systems hereinabove referenced in U.S. Pat. Nos. 3,893,772 and 3,633,212 have an objective similar to that of the present system. In design, only characteristic feature hereinabove noted as (3) of the present system is seen in U.S. Pat. No. 3,893,772 where the principle of the angle measurement is shown, while in the present system it is utilized to establish the correct sign of the driving force of the follower.

In accordance with a preferred embodiment of the pesent invention, a scanning angle tracker optical system is provided in which a single laser beam is expanded and split into two beams which intersect on a scanning mirror and diverge toward the object. While the beams are diverging from each other, they are each at the same time focusing on the target object. The scanning mirror sweeps the beams across a strip (e.g. about 1 millimeter wide) of retro-reflective tape on the object. As each beam crosses the tape, a return signal is generated which follows the original beam path until it is folded into two photomultiplier tubes by two small beamsplitter/mirror combinations. Each photomultiplier detects the signal from only one beam. Photographs of the object tape at several angular positions and corresponding oscilloscope traces are illustrative of signal changes as a function of angle.

The photomultiplier signals are first hard limited into fast rise TTL pulses by conventional methods. The optical system is disposed on a mount which is capable of rotating the plane of the emitted beams around their bisector. The rotation is servo controlled to seek alignment of the left and right beams on the retro-reflective tape. If the target is tilted from the horizontal, the beam plane is driven to tilt by the same angle. When the zero beam crossing time difference is again reached, the angle is read from a shaft encoder on the angle tracker. The beams are forced to cross the tape line simultaneously by rotating the tracker until they do, and then reading the angle. The direction which the tracker must rotate is determined by which pulse, left or right, strikes the tape first.

The difficulties and disadvantages (1) through (6) enumerated above with respect to interferometric systems are alleviated in the present system for the following reasons:

(a) The present system can be made to track a 360 degree motion of the target.

(b) The present instrument tracks and reads absolute angle and the true angle is recovered after temporary loss of signal.

(c) The present system electronics are less sensitive to low S/N problems, and further, the pulse return of a focused laser beam on a retro-reflective tape represents a very high S/N ratio.

(d) All optical devices are sensitive to index of refraction changes, e.g. high temperature turbulence; however, these changes are dependent on the particular type instrument. The longer the periods of dropout for an interferometric device, the greater the amount of possible accumulated error. In contrast, the scanning angle tracker embodiment of the present invention recovers from each dropout period. While short term errors may exist in the present system, they are not additive. And, when the disturbance passes, the error will again approach zero.

(e) The present scanning angle tracker system embodiment of the invention views the object normal to the plane of tilt thereby permitting wind tunnel angle of attack monitoring from a side window with all associated system electronics conveniently positioned down at floor level.

(f) The present system has a basic sensitivity which may be varied by changing the beam separation on the target. For reduced angular excursions, increasing the separation increases sensitivity and vice versa.

A full understanding of the invention, and of its further objects and advantages and the several unique features thereof, will be had from the following description when taken in conjunction with the accompanying drawings which:

FIG. 1 is an optical schematic diagram in accordance with a first embodiment suitable for use in the present scanning angle tracking system;

FIGS. 2, A, B, and C are illustrative of three angular positions of the object tape and corresponding oscilloscope traces demonstrative of signal changes as a function of angle when utilizing the present scanning angle tracking system;

FIG. 5 is a calibration curve showing model pitch angle versus indicated by the instrument;

FIG. 6 is a block diagram illustrative of a signal processor embodiment utilized in the present scanning angle tracking system;

Figure 3:
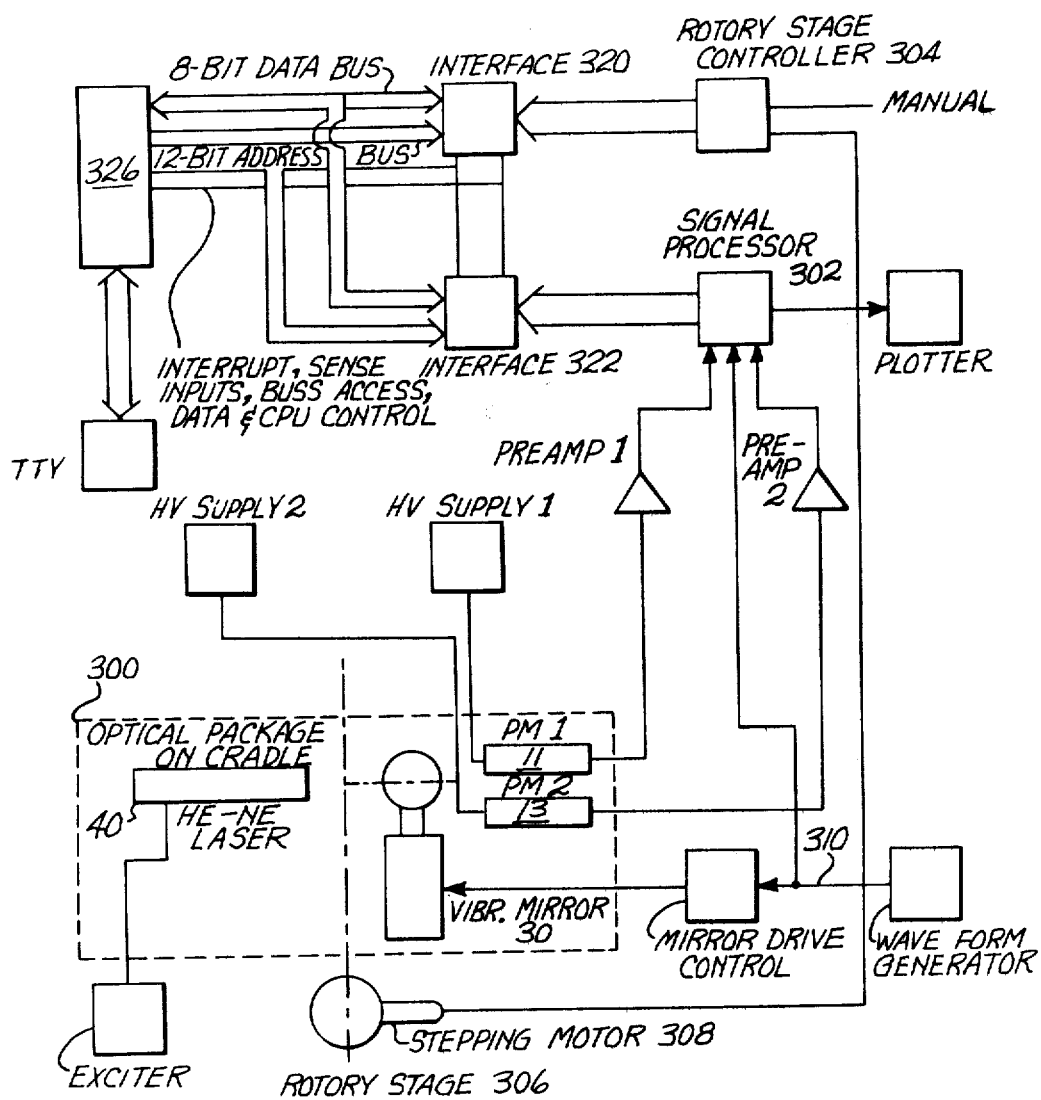
FIG. 3 is a block diagram of the present scanning angle tracker system.
Figure 8A:
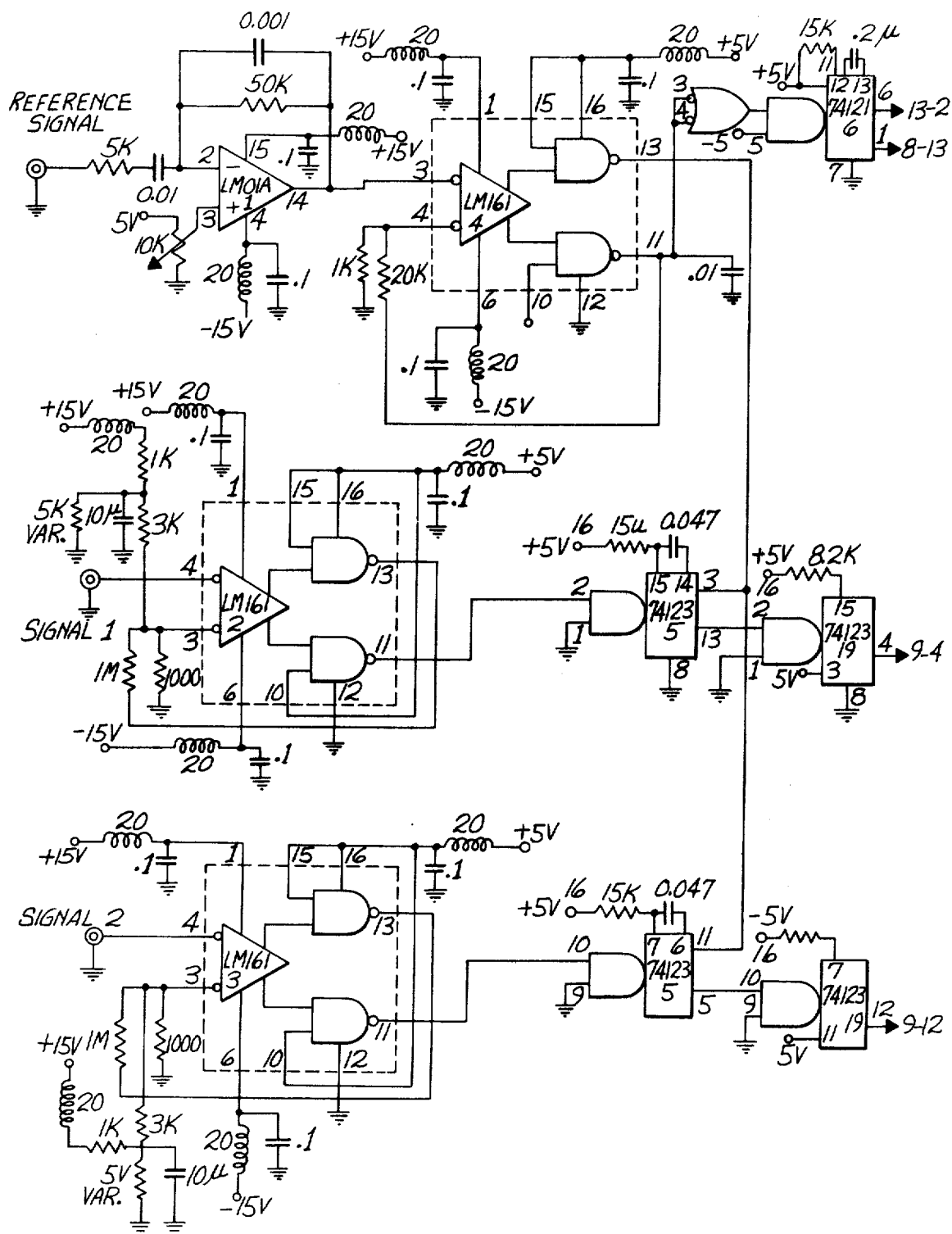
Figure 8B:
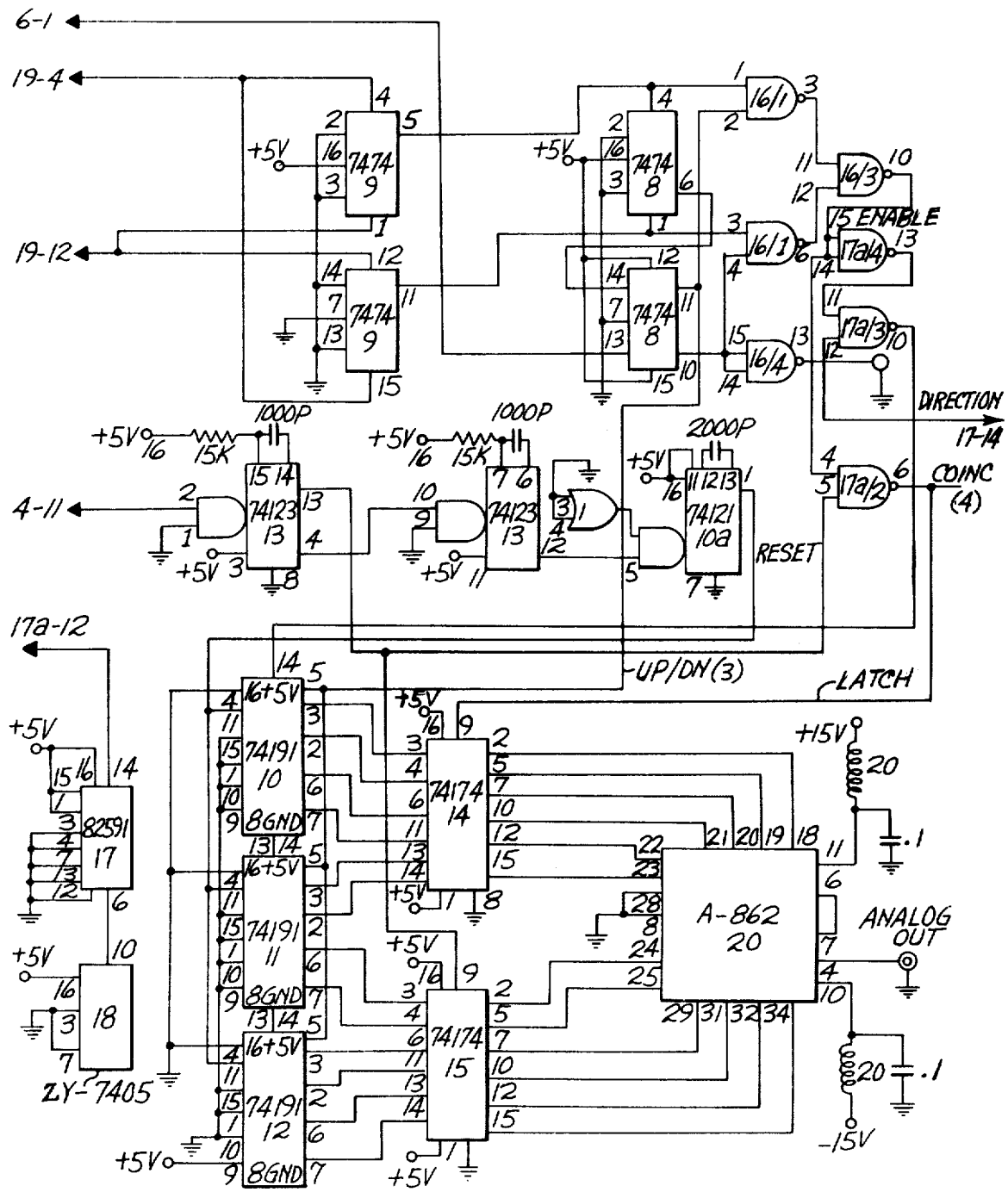
Figure 9:
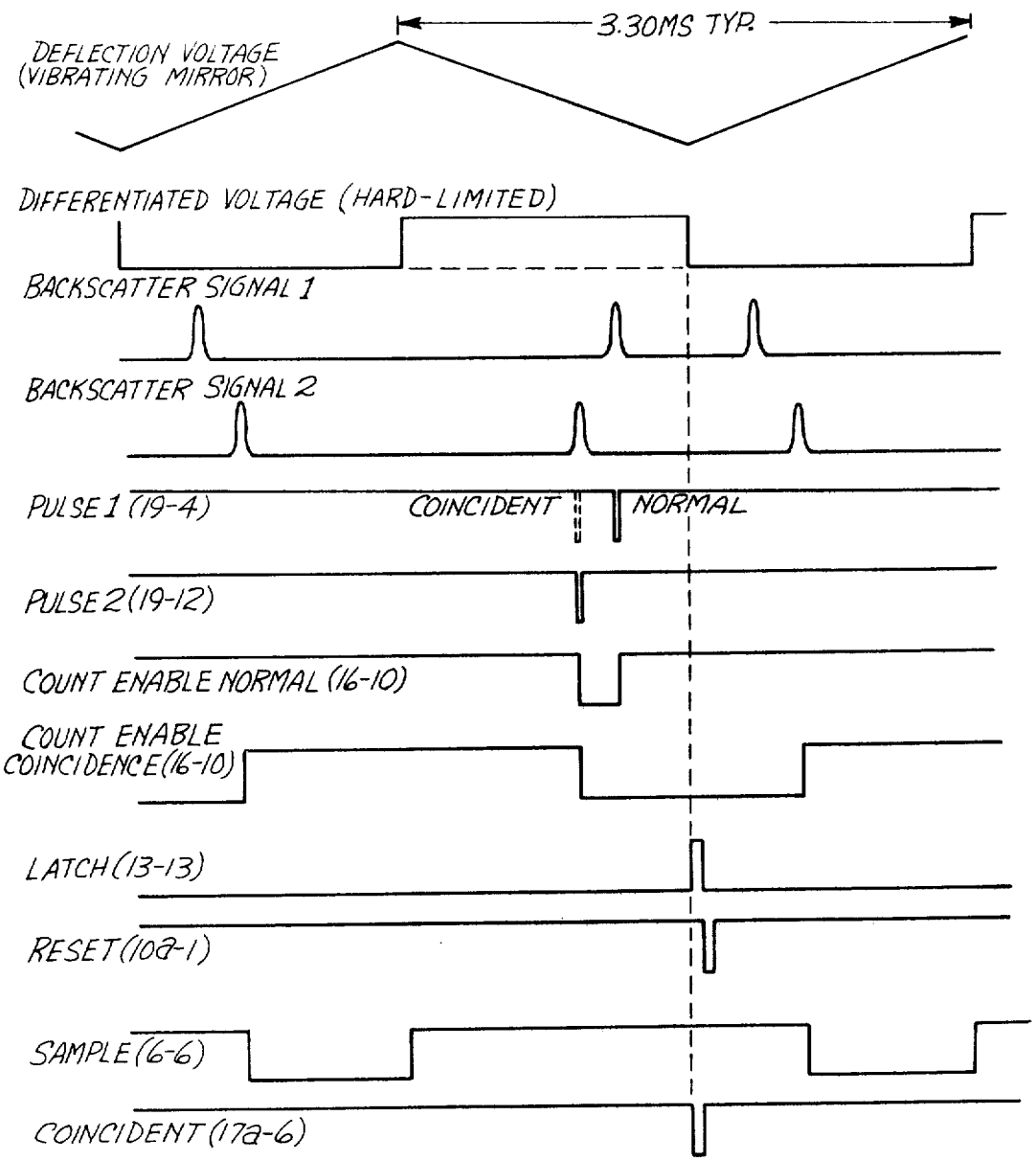
Figure 10:
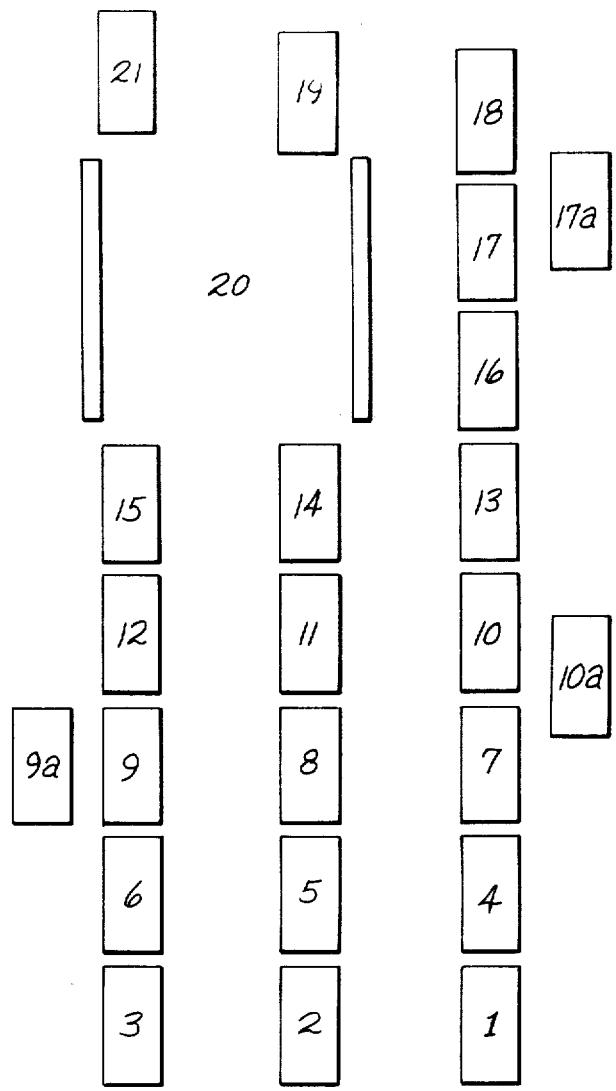
Figure 11A:
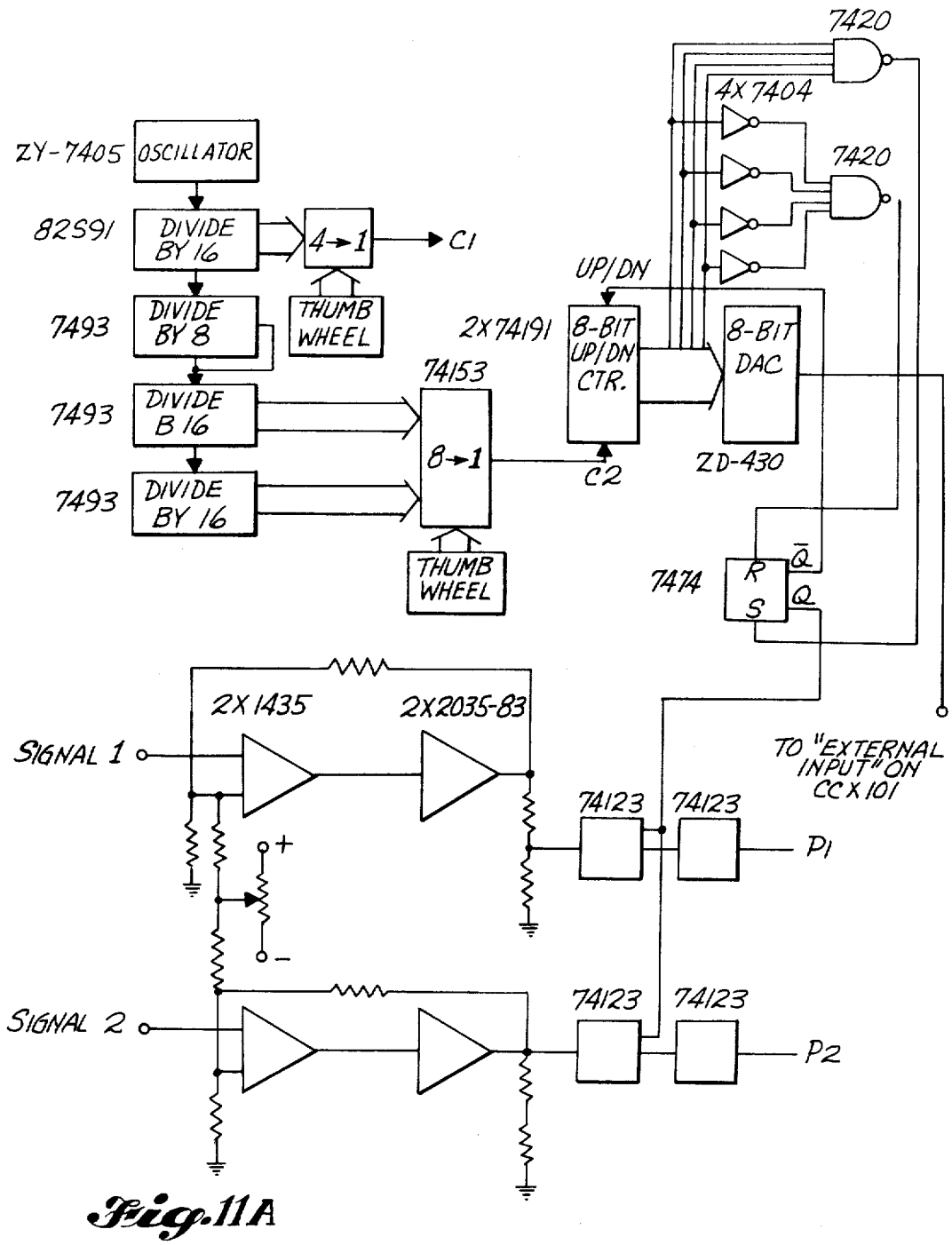
Figure 11B:
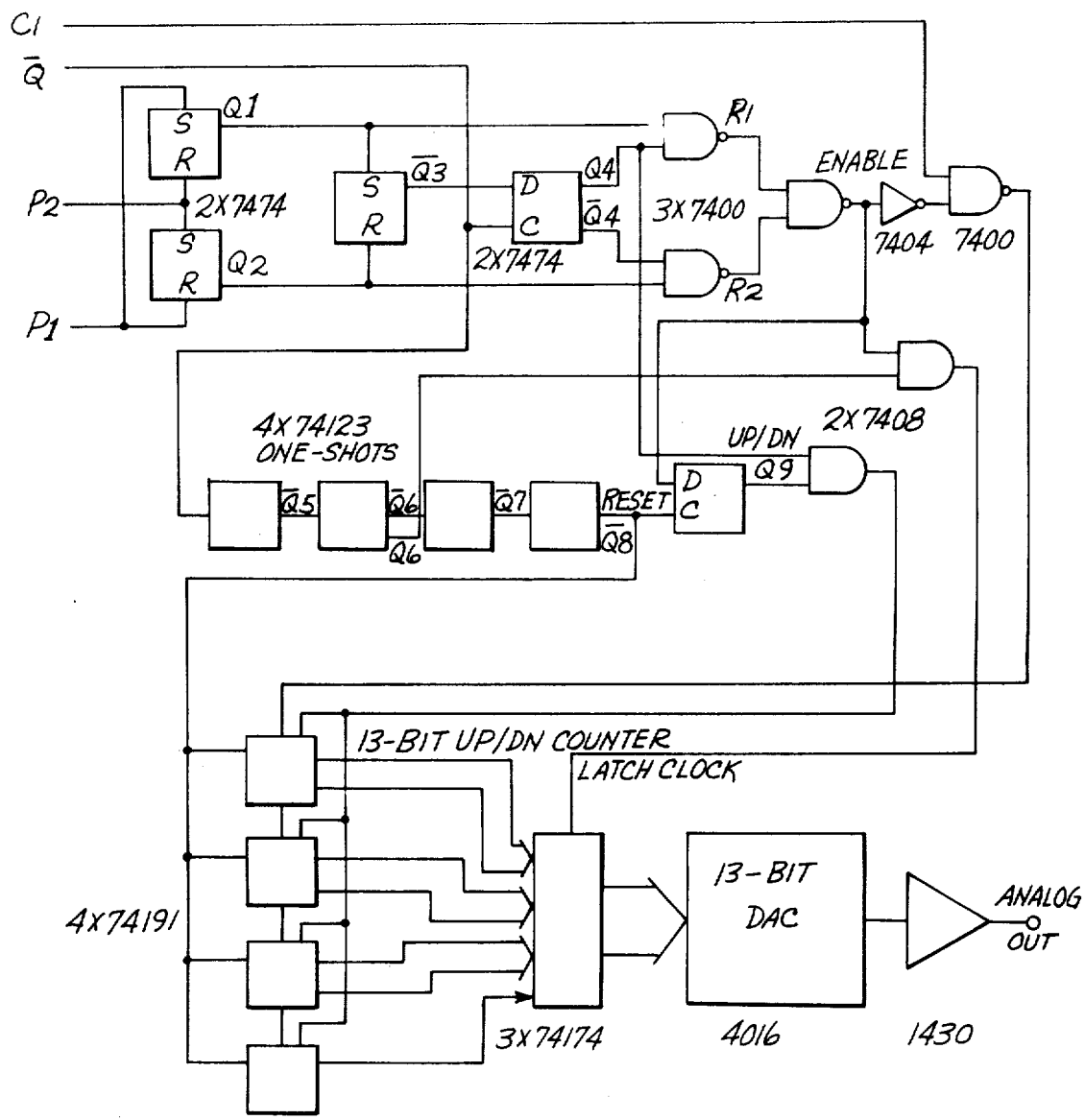
Figure 12:
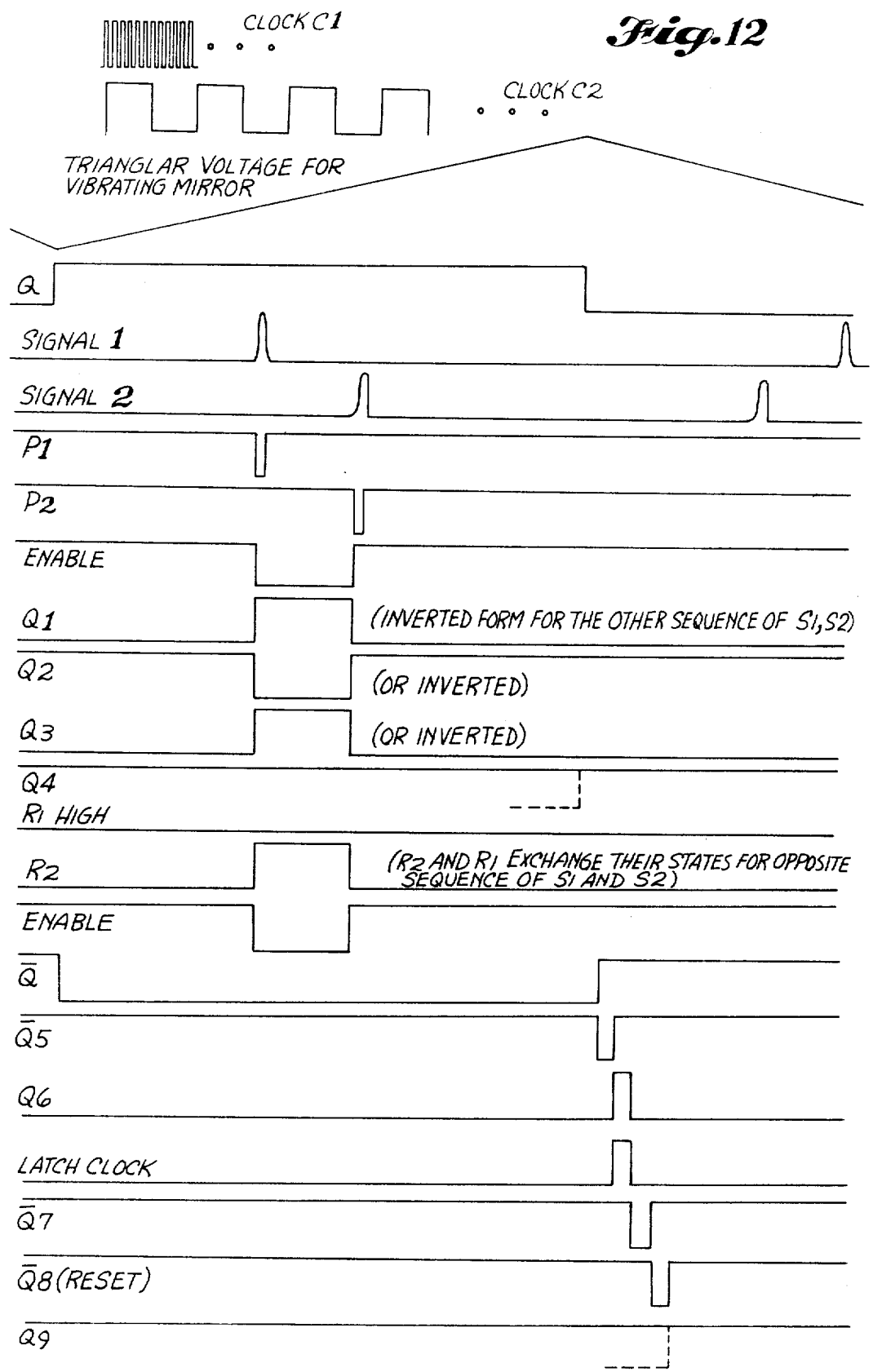
Figure 13:
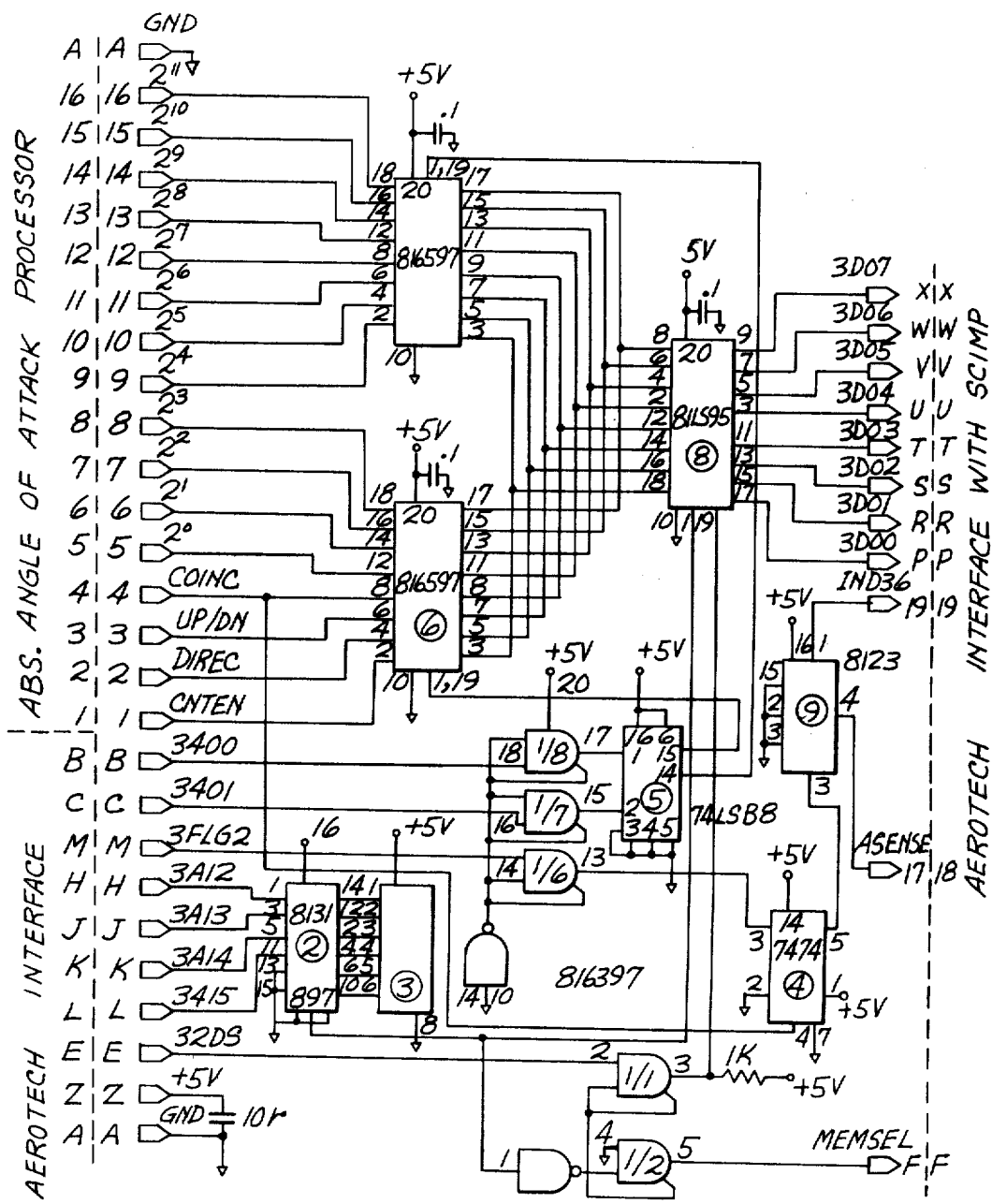
Figure 11:
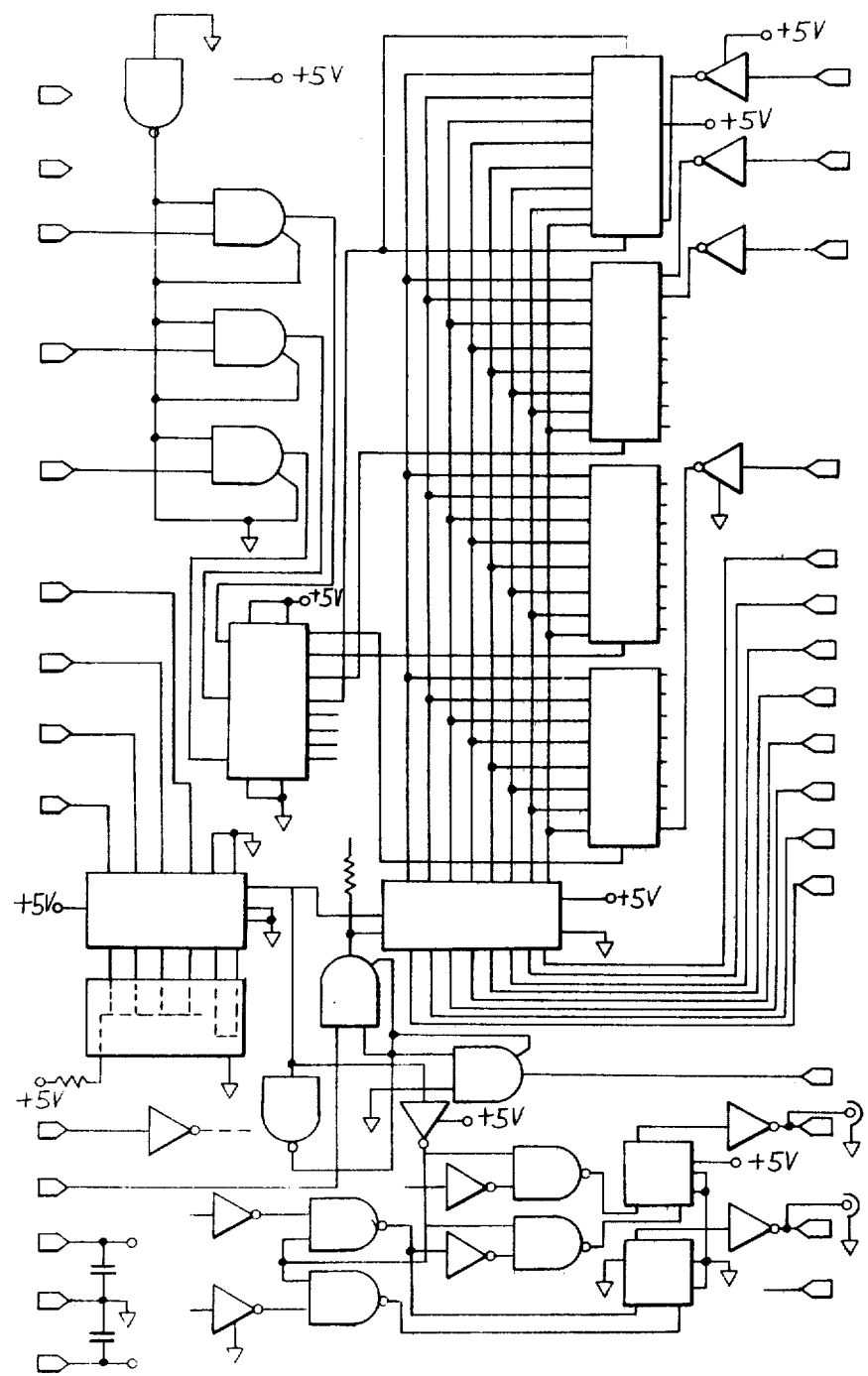
Figure 15:
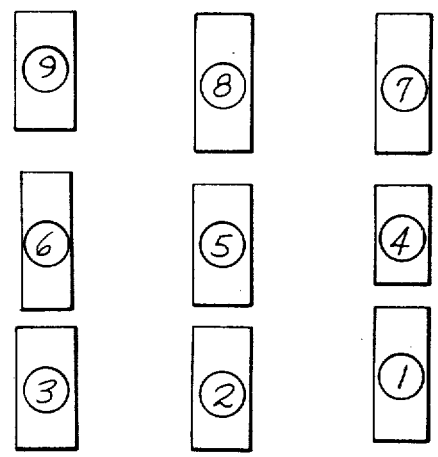
Figure 16:
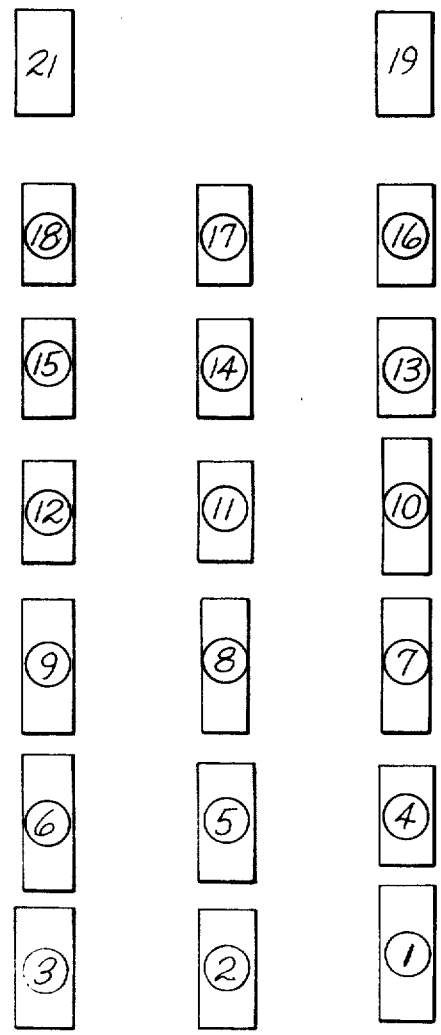
Figure 19:
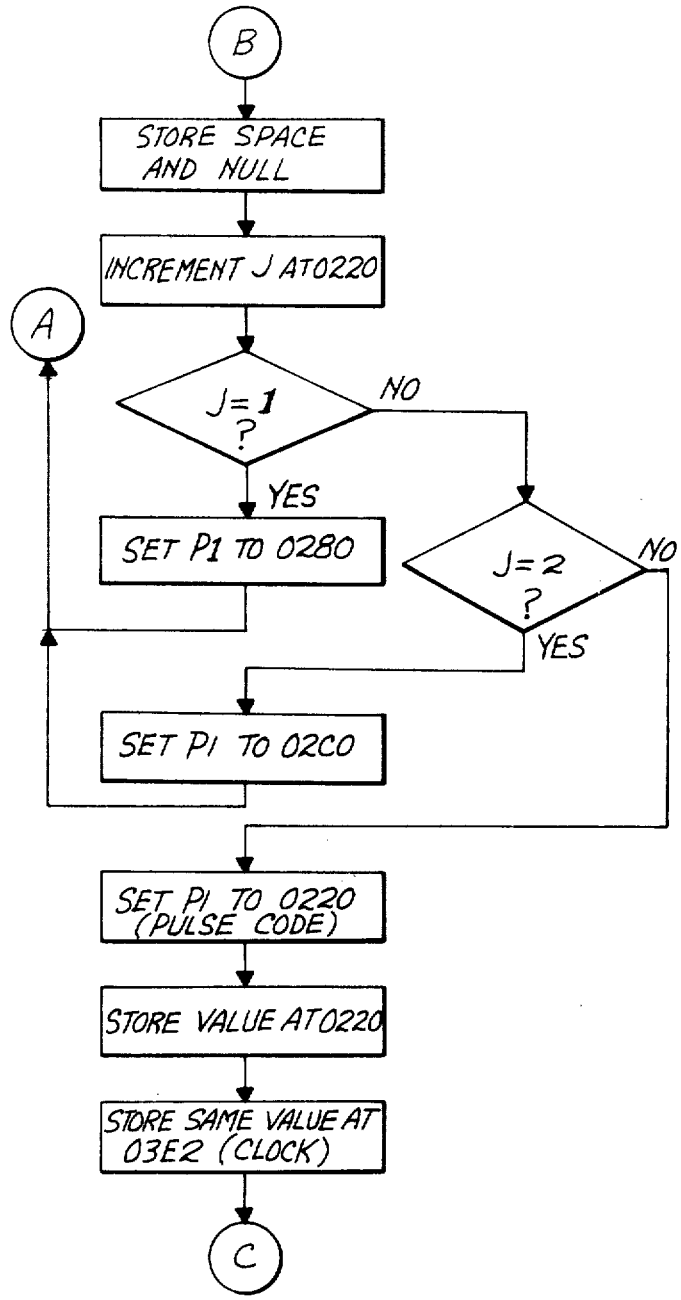
Figure 20:
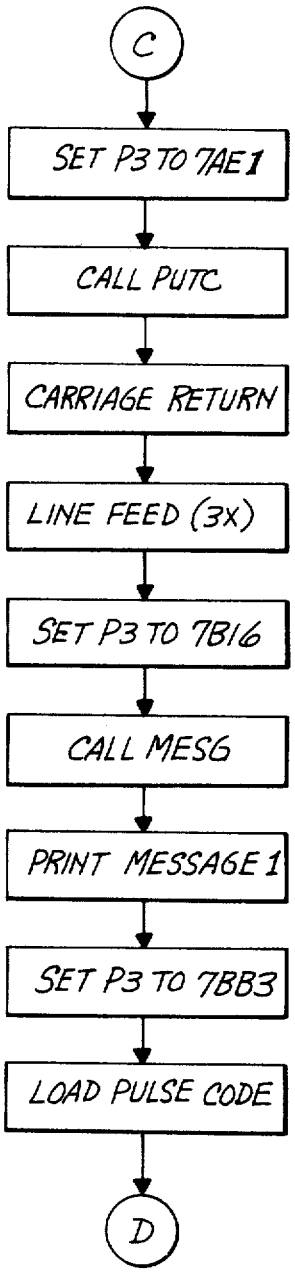

FIGS. 8A and 8B, when taken together, show a complete circuit schematic diagram of the present signal processor shown in block form in FIG. 6;

FIG. 9 is a timing diagram deemed helpful in an understanding of the operation of the signal processor shown in the detailed schematic of FIGS. 8A and 8B;

FIG. 10 is a diagram helpful in component layout of the signal processor of FIGS. 8A and 8B;

FIGS. 11A and 11B show a schematic diagram of a further embodiment of signal processor suitable for use in the present scanning angle tracker system of FIG. 3;

FIG. 12 is a timing diagram deemed helpful in an understanding of the operation of the signal processor shown in FIGS. 11A and 11B;

FIG. 13 is a schematic diagram of a first interface circuit utilized for communication between control for the cradled platform of the optical package and the signal processor;

FIG. 14 is a schematic diagram of a second interface circuit utilized for communication between the rotary stage controller and the signal processor;

FIG. 15 is a diagram helpful in organization of component layout of the first interface circuit of FIG. 13;

FIG. 16 is a diagram helpful in component layout of the second interface circuit of FIG. 14;

FIG. 17 is a short flow diagram of the application program for the compensation mode of operation of the present scanning angle tracker system; and FIGS. 18 through 28 are a detailed flow diagram of the application program for the compensation mode shown in FIG. 17.

INTRODUCTION

Because of the complexity of the following description which is given in the interest of completeness, frequent cross-referencing is necessary. In order to simplify this as well as the problem of looking up specific subsystems such as optical, signal processing, and software description, the description has been organized into numbered chapters and sub-chapters. To assist in locating any specific item, the following "TABLE OF CONTENTS" is now presented which serves also to show the organization of the present system description at a glance.

TABLE OF CONTENTS

I. GENERAL INFORMATION
II. PRINCIPLE OF OPERATION
III. CAPABILITIES
III.1. Direct Readout Mode
III.2. Compensation Mode
III.3. Precision of Angle Data
III.4. Error Sources
IV. HARDWARE DESCRIPTION
IV.1. Systems Block Diagram
IV.2. Optical Package
IV.2.1. Optics
IV.2.2. Second Embodiment Optics
IV3. Signal Processor in General Block Diagram
IV3.1. Present First Embodiment Signal Processor
IV.3.2. Second Embodiment Signal Processor
IV4. Microprocessor Interfaces
IV4.1. RAM Assignments
IV.4.2. Device Address Assignments
IV4.3. SC/MP Interface with Signal Processor (IF1)
IV4.4. SC/MP Interface with Stage Controller (IF2)
V. SOFTWARE DESCRIPTION
V.1. Loading and Executing the Applications Program
V.2. Applications Program for Compensation Mode
V.2.1. Short Flow Diagram
V.2.2. Detailed Flow Diagram
V.2.3. Assembly Language Program
V.2.4. Machine Code Program

I. GENERAL INFORMATION

The following description relates to an opto-electronic angle sensor and, more specifically, to a retro-reflective electro-optical angle measuring system. This description should enable the user to maintain, troubleshoot or integrate the instrument into other diagnostic systems.

The scanning angle tracker allows the user to carry out non-contact measurements of the angle between a reference plane (mostly the hoizontal plane) and a target vector (mostly in a vertical plane normal to the direction of observation). The angle range is $-45°$ to $+45°$ or more, the precision is better than $0.1°$ in general and $0.01°$ with care. The instrument measures absolute angle (and not angular changes as in interferometric systems) and recovers the correct value if the signal is intermittently interrupted.

The instrument is suitable for the measurement of angle of attack of wind tunnel models where it is practically insensitive to roll or yaw and also operable in turbulent or intermittently foggy air. It is also applicable in structural measurements such as distortions of aircraft wings and static and dynamic loads on the ground and in flight. Furthermore, the instrument can be applied as an alignment tool in construction and on rotating parts as a stroboscope and torque meter.

The embodiment described in Secs. IV.2.1. and IV.3.1. has been debugged and tested. A second embodiment described in Secs. IV.2.2. and IV.3.2. incorporates further improvements of the first embodiments.

II. PRINCIPLE OF OPERATION

Figure 1:
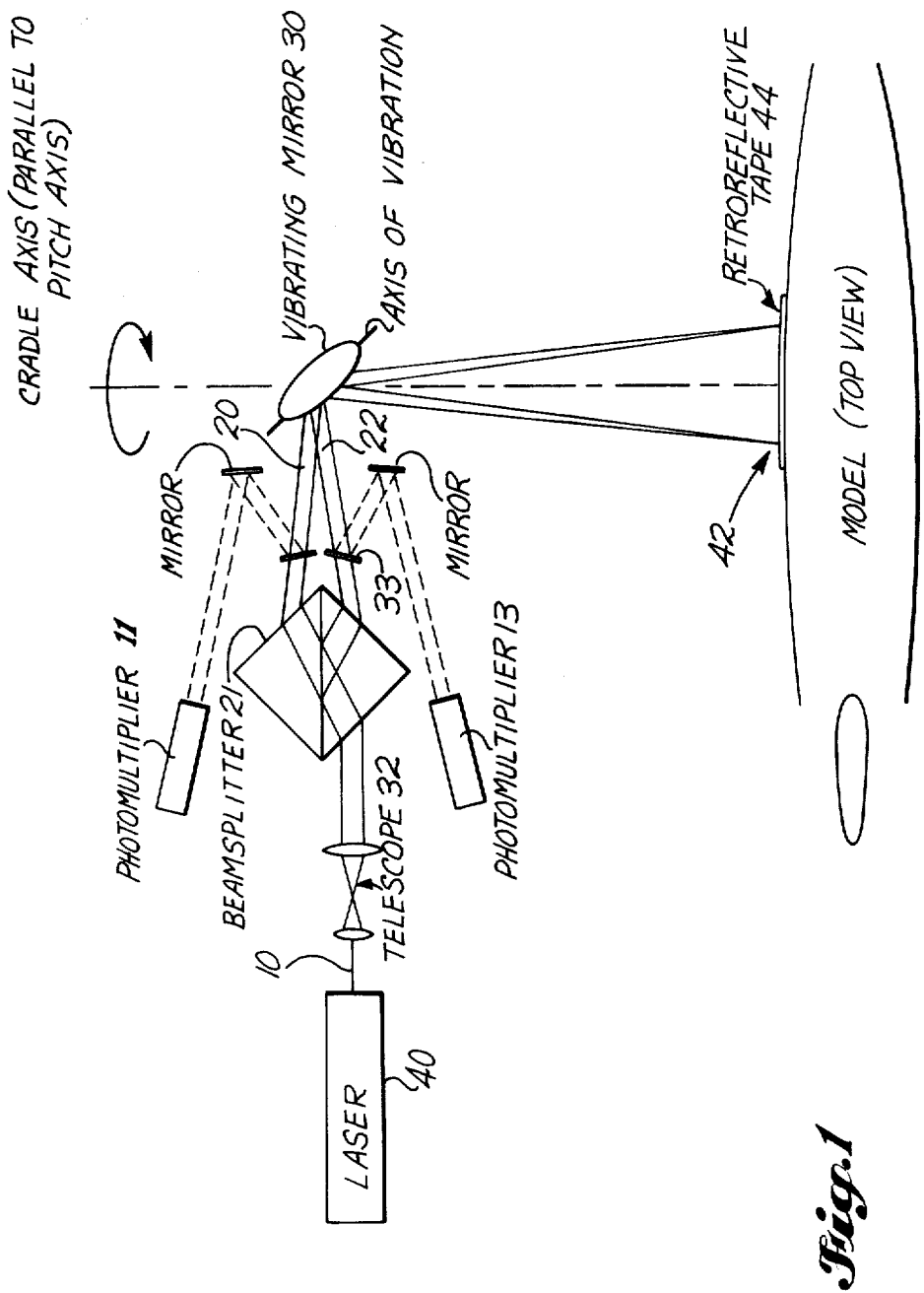

While a detailed description of the optical package and the electronic processor is given in Sec. IV., the principle of operation is described here with reference to FIG. 1 illustrating an application in a wind tunnel for the measurement of angle of attack. Other applications of the present system concept will become apparent to those skilled in the art.

A single laser beam 10 is expanded, split into two beams 20 and 22 which intersect on a vibrating mirror 30 and then intercept the target object at a distance of 1–5 m. A telescope 32 on the laser head 40 in conjunction with the beamsplitter 21 allows the expanded beams to diverge relative to each other and simultaneously come to a focus on the target surface 42. The two beams form a plane whose orientation is continuously varying as a result of the mirror 30 vibration. The plane formed by the two beams when the mirror is at rest serves as the reference plane in the angle measurement. Most frequently the reference plane is horizontally aligned. The optical package which includes laser head 40 rests on a cradle fitted with an electronically controlled high-precision rotation stage (e.g. a Klinger RT-160 manufactured by Microcontrole Electronique of Vitry-sur-Seine, France,) effecting rotations through an angle range from $-45°$ to $+45°$ such that the rotation angle is known to within $0.002°$. Because of the capability of rotation of the optical package on its cradle, the reference plane can be chosen to form angles relative to the horizontal in the range $-45°$, $+45°$.

Scanning mirror 30 provides the function of sweeping the plane containing the two beams up and down across target surface 42. A narrow strip of retro-reflective tape 44 (appr. 1 mm wide) stretched to a straight band and attached to the target surface 42 by adhesive backing is intercepted by the two beams twice during each sweep cycle. As is readily seen, the interception times coincide only if the edge of retro-reflective tape 44 is parallel to the reference plane. Otherwise, a time difference between the interception events will be observed. If the angular motion of mirror 30 follows a driving force of triangular waveform, the observed time difference is equal to $$t = \frac{T}{2\gamma_0} \arcsin \{\sin\alpha\sin\beta/\cos\tfrac{1}{2}(\gamma_1 + \gamma_2)\} \quad (1)$$

where T is the period of the driving force, $\gamma_0$ the angular amplitude of the deflected plane containing the two illuminating beams, $\alpha$ the tilt angle to be measured, $2\beta$ the angle between the two incident beams, and $\gamma_1$, $\gamma_2$ the angular excursions of the deflected beam plane at the instances of target interception.

Figure 2C:
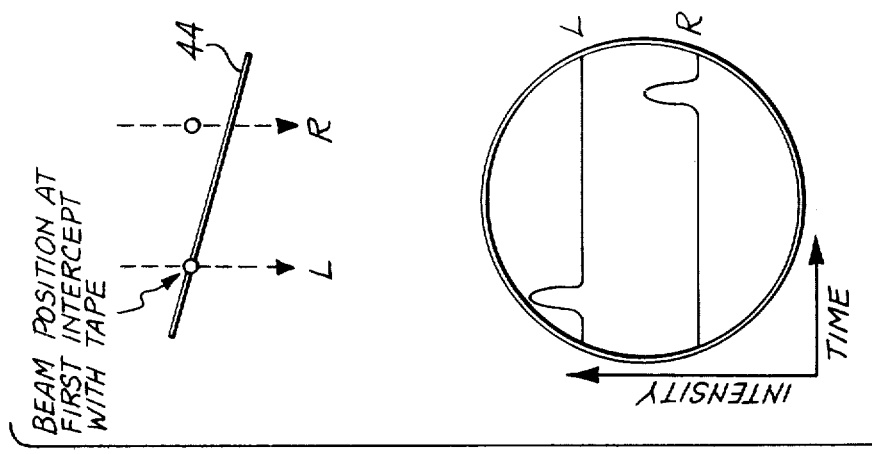
Figure 2B:
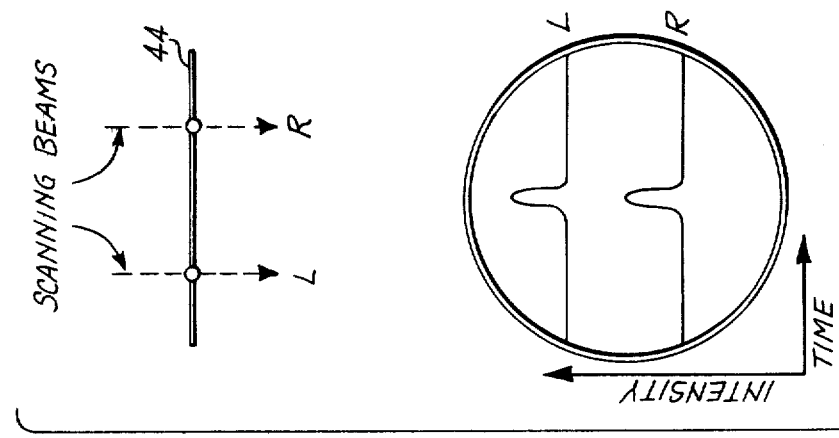
Figure 2A:
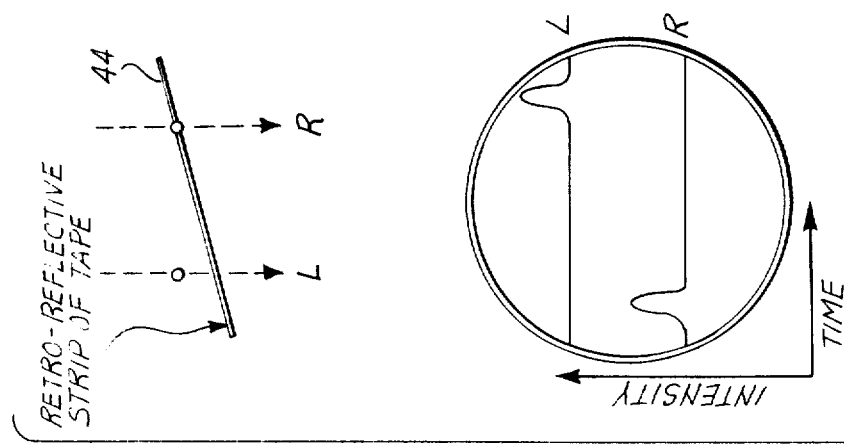

FIGS. 2A, 2B, and 2C show oscilloscope traces which result from scanning the object at three different angular positions. The whole optical system is supported by a cradle which can rotate the plane of the emitted beams around their bisector. The rotation is servo controlled to seek alignment of the left and right beams on the retro-reflective tape as seen in the scope screen of FIG. 2B.

Figure 4:
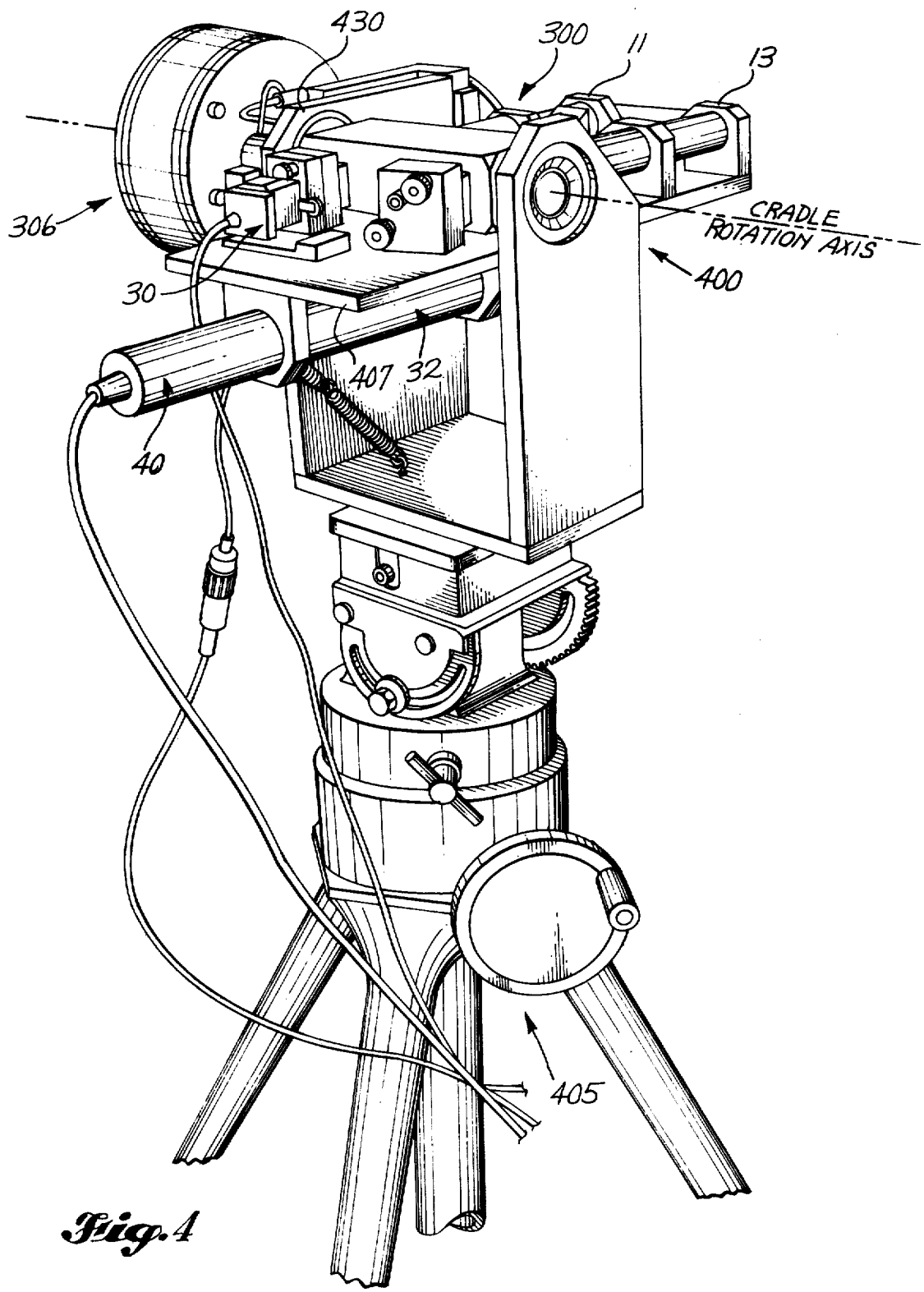
FIG. 4 is a view in perspective of the tripod mounted optical package with rotary stage shown in the block diagram of FIG. 3.

FIG. 3 shows a block diagram of the various subsystems or elements that form the measurement system. They will be further discussed in Sec. IV. It is seen that the system consists of the optical package, the mirror drive voltage supply, the rotation stage controller, the electronic porcessor, and a microprocessor with teletype for control of the cradle in the compensation mode. The scanning angle tracker then functions as a target angle follower (see Sec. III.2.). FIG. 4 is a view of the optical package mounted on a tripod, while FIG. 6 gives an overview of the microprocessor-controlled system.

III. CAPABILITIES

The present scanning angle tracker system can be used in (a) the direct readout mode, and (b) the compensation mode. The two operational modes have different advantages and limitations, depending on the application. The precision and the various error sources in general also differ in the two modes. Their capabilities are described as follows.

III.1. Direct Readout Mode

In the direct readout mode mechanical mount 400 as seen in FIG. 4 of optical package 300, termed a cradle, is held in a fixed position, usually leveled horizontally. Then the time difference $\Delta t$ between retro-reflective interceptions across the target tape is given by equ. (1). As shown in FIG. 3, electronic signal processor 302 (see Sec. IV.3.) measures $\Delta t$ and puts out a digital word representing $\Delta t$ and also its voltage analog for plotting vs. time. The output signal is updated at the frequency of vibrating mirror 30, usually at 200 Hz. From Eq. (1) there follows a non-linear relationship which, however, becomes linear for small angles $\beta$ and $\gamma$, because Eq. (1) then simplifies to $$\Delta t = c\alpha \quad (2)$$

where $$c = (T/2\gamma_o) \sin \beta/\cos\tfrac{1}{2}(\gamma_1 + \gamma_2) \quad (3)$$

which is constant whenever $\gamma_1 + \gamma_2$ stays constant during a measurment series.

The calibration constant c is independent of the working distance and is affected by the mirror vibration period and the deflection angle amplitude $\gamma_o$. These two quantities usually have fixed values for long measurement series. The bias angle $\tfrac{1}{2}(\gamma_1 + \gamma_2)$ can be kept close to zero by selecting symmetrical alignment so that $\gamma_1 = = \gamma_2$. The calibration constant can be found by measuring the output of signal processor 302 vs. the rotation angle of the cradle as read out by the stage controller 304 during a calibrating cradle rotation run prior to the actual traget angle test. FIG. 5 shows a calibration curve which is linear for all practical purposes. Deviations from linearity are in fact only expected for short working distances (smaller than 1 m) when $\beta$ and/or $\gamma$ may no longer be only small.

The direct readout mode requires no microprocessor and is easily applicable whenever there is no problem finding the calibration constant prior to the test. The operation is limited, however, to time-proportional deflection of scanning mirror 30. Sinusoidal drive voltages, for example, will render Eq. (2) non-linear.

III.2. Compensation Mode

An alternate method to measure the angle $\alpha$ of the target tilt consists of rotating the cradle until the two beams incident on the target intercept retro-reflective tape 44 simultaneously. Signal processor 302 output is then close to zero. Hence, by nulling the output, the cradle can be aligned parallel to target tape 44 and can now be read from the controller output of rotation stage 304. An initial zero reset of the controller output can serve as the reference direction, often established as the horizontal direction by use of a precise level (20" bubble).

Nulling signal processor 302 output can be effected by the operator, or more preferably, under control of a microprocessor. In fact, if used with a microprocessor, the scanning angle tracker can be employed as a follower for sufficiently slowly moving targets. Obviously, no calibration is required in this case. Furthermore, the waveform driving scanning mirror 30 can be non-linear; for example, it can be sinusoidal. Since the cradle carrying the optical package 300 must be moved in toto, there is a limitation with regard to the slew rate which is then appr. $5°$ sec$^{-1}$.

III.3. Precision of Angle Data

If optical transmission through the atmosphere would follow a straight line, the precision of an angle measurement by the present angle tracker system could be defined as given by the resolution of the clock. With a clock frequency of 40 MHz as used in the present instrument, furthermore with a mirror frequency of 200 Hz, a mirror deflection amplitude $\frac{1}{2}\gamma_o=1°$ and a beam divergence angle $\beta=1°$, one then obtains from Eqs. (2) and (3)

$$\delta\alpha = \frac{1}{40 \cdot 10^6 \cdot 1.25 \cdot 10^3} = 0.00002 \text{ rad or } \delta\alpha = 0.0011°. \quad (4)$$

This value can be regarded as the short-term or instantaneous precision which is theoretically possible with the present instrument. To come close to this theoretical value, the level detectors which follow the amplification stages in signal processor 302 must be free of jitter to within 25 ns. For this reason LM161 comparators are used in the present exemplary circuit of FIGS. 8A and 8B.

The resolution precision Eq. (4) must be qualified, however, owing to the special transmission problems encountered in turbulent air. The output data from an instrument of the present type fluctuates with a frequency spectrum typical for the air turbulence in the beam transmission region. In a warm laboratory environment these frequencies are peaking in the range 0.1 to 10 Hz. A simple experiment to test the effect of air turbulence on the performance of the angle tracker consists of discharging hot air from a heat gun into the beam path. This will not upset the data output, which is a great advantage hereinbefore mentioned of the present instrument compared with interferometric devices. But the data output when plotted vs. time will be noticeable noisier than before. Hence, instead of the value given by Eq. (4), the resolution may depend on the turbulence. In the present instrument the clock pulse rate is reduced from 40 MHz to about 2 MHz by a divide-by-16 counter as shown in the circuit schematic of FIG. 8B. The resulting precision is then 0.018° which is indeed confirmed by the experience obtained with the instrument thus far. Higher resolution may be obtainable, however, provided a higher clock rate is employed. Frequency division of the clock rate of the master clock by 2 or 4 can be readily obtained by moving the present output of device 17 in FIG. 8B from pin 14 to pin 11 or 5.

The use of a pulse rate smaller than possible also represents a compromise with regard to the word length of the digital output of the processor. In the first embodiment, a 12-bit DAC is used which allows operation in the full angle range with a clock rate of about 2 MHz. In the second embodiment, a 13-bit DAC will be used permitting at least a factor 2 in the resolution as improvement by going to a clock rate of 5 MHz or even 10 MHz.

III.4. Error Sources

There are several error sources which affect either the calibration in the direct readout mode or, in the compensation mode, produce a difference between test target and cradle orientations.

(a) Retro-reflective Tape 44 Imperfections

It has been found that the retro-reflective tape on the test target must be as straight as possible in the projection plane normal to the viewing direction. This is not an easy task to accomplish, particularly not on curved object surfaces such as airplane wings or fuselages.

During the setup phase of the target, however, a simple white-light illuminator in conjunction with a beamsplitter and long-focal length telescope can serve to obtain a good estimate of the deviation from a straight line.

(b) Timing Electronics

Since the angle value is derived from the measurement of a time interval, the precision of the latter is most important. It depends on the performance of the analog comparators and on the clock frequency as discussed in Sec. III.3. It also depends on the signal-to-noise ratio of the photomultiplier output. Noise contributes to the uncertainty of the time interval. In Sec. IV.2.2. a change of the present optics is shown which will help to increase S/N by at least a factor 10 and which provides demonstrated superior performance.

(c) Slew Rate

The slew rate of cradle 300 equipped with high-precision rotary stage 306 is a few degrees per second. The pulse rate into stepping motor 308 is variable. The rotary stage controller 304 provides manual adjustment of the pulse rate or control under a microprocessor. The target, however, may rotate much faster. In such cases only the final value of the angle readout obtained after equilibrium has been reached is meaningful. The cradle slew rate is large enough, however, to follow the mean angle of attck of a wind tunnel model and to monitor the angle fluctuations via the direct readout mode.

(d) Non-Linear Scan Mirror 30 Drive Voltage 310

The triangular voltage 310 that drives scan mirror 30 does not produce a precisely constant angular velocity of the mirror. This is the result of the inertia of the mirror which cannot reverse its direction abruptly. As a result, the angle readout depends slightly on the relative position of the scanned arc and the retro-reflective tape. The effect can be kept small in the direct readout mode by centering the tape on the illuminated arc. It is, of course, of no consequence in the compensation mode.

(e) Non-Linear Response

Eq. (1) shows that in principle the instrument has a non-linear response to an input caused by an angle $\alpha$. As already discussed in Sec. II, the non-linearity is always small and even negligible at long working distances, because the angles $\beta$ and $\gamma$ are then necessarily small so that the simplifications Eqs. (2) and (3) become applicable. Furthermore, in Eq. (3) the cosine term in the denominator can be replaced by unity for symmetrical scanning, because then there holds $\gamma_1=\gamma_2$. It should be noted, however, that significantly increased values of $\beta$ or $\gamma$, owing to short working distances, will give rise to non-linearities which then must be included in the calibration curve.

IV. HARDWARE DESCRIPTION

IV.1. Systems Block Diagram

The scanning angle tracker comprises optical package 30 mounted on a tripod 405 (as seen in FIG. 4), rotary stage controller 304 and readout electronics, scan mirror drive electronics, signal processor 302, the signal readout DVM (or other form of readout), and auxiliary electronic systems such as the microprocessor, teletype, plotter, and oscilloscope. As indicated in the block diagram of FIG. 3, the minimum system does not include the microprocessor and the teletype. Even as a minimum system, however, the instrument can still be operated in the compensation mode by manual control of the rotation stage (as indicated by the legend "MANUAL"). Also included in the block diagram are the two interfaces 320 and 322 between microprocessor 326 and rotary stage controller 304 and signal processor 302, respectively. The interface for the teletype (TT+Y) is included in microprocessor 326 in the present embodiment (a National Semiconductor Corp. type SC/MP Development System).

IV.2. Optical Package

IV.2.1. Optics

The layout of the optical components is seen in the perspective of FIG. 4 which should be compared with the schematic of FIG. 1. The beam-expanding telescope 32 is mounted directly on laser head 40 (Spectra Physics Model 311). Laser 40 (e.g. a Spectra Physics Model 145, 2 mW, He-Ne) is mounted under cradle base plate 407 so that the output beam must be folded back into the working plane above base plate 407. This is effective by 2 coated (Porro) prisms. The beam then enters a cube beamsplitter 21 oriented diagonally which is mounted on an adjustable turntable 23 so that the separation and divergence angle of the two output beams can be adjusted. Two smaller beamsplitters 31 and 33 immediately following large cube 21 (see FIG. 1) are of the plate type with partially reflecting metallic surface coatings. Their function is to intercept the retro-reflected light and to steer it into photomultipliers 11 and 13. The two laser beams are made to cross on vibrating mirror 30 which is part of a General Scanning G-100PD/CCX-100 servo-controlled scanning system, about 10 mm diameter. The vibrating mirror 30 is followed by the final fold-out mirror 430 whose axis coincides exactly with the cradle rotation axis. The mirror axis bisects the angle between the two output beams. This configuration avoids non-linearities of the instrument response caused by "walking" of the beam intersection points on retro-reflective tape 44 during cradle 400 operation.

The retro-reflective tape 44 may e.g. comprise Minnesota Mining & Mfg. Co. (3M) type No. 7610 High Gain Sheeting. It consists of a layer of microscopically small glass beads bonded to 0.005" mylar with adhesive backing. Such tape can adhere to a wind tunnel model with little perturbation of the boundary layer. When used for the measurement of angle of attack, a suitable tape is about 100 mm long and 1 mm wide.

The retro-reflected light traces back its incident path and is finally folded out by plate-type beamsplitters 31 and 33 into photomultipliers 11 and 13 (e.g. Radio Corp. of America type 4836-2C) which have dimensions ⅜" diameter × 3.8" length. As shown in FIG. 4, photomultipliers 11 and 13 are mounted in adjustable housings which accept the light through interference filters for the 6328 Å He-Ne radiation. The housings also have apertures for the reduction of straylight.

The output power of the instrument is approximately 180 μW per beam after careful cleaning of all optical components.

IV.2.2. Second Embodiment Optics

While the aforementioned optical configuration of FIG. 1 has proved to be satisfactory and relatively inexpensive, there are applications where more effective utilization of the laser power is desirable. Such applications include operation at distances larger than 4 m or operation through several layers of ordinary uncoated windows.

Figure 7:
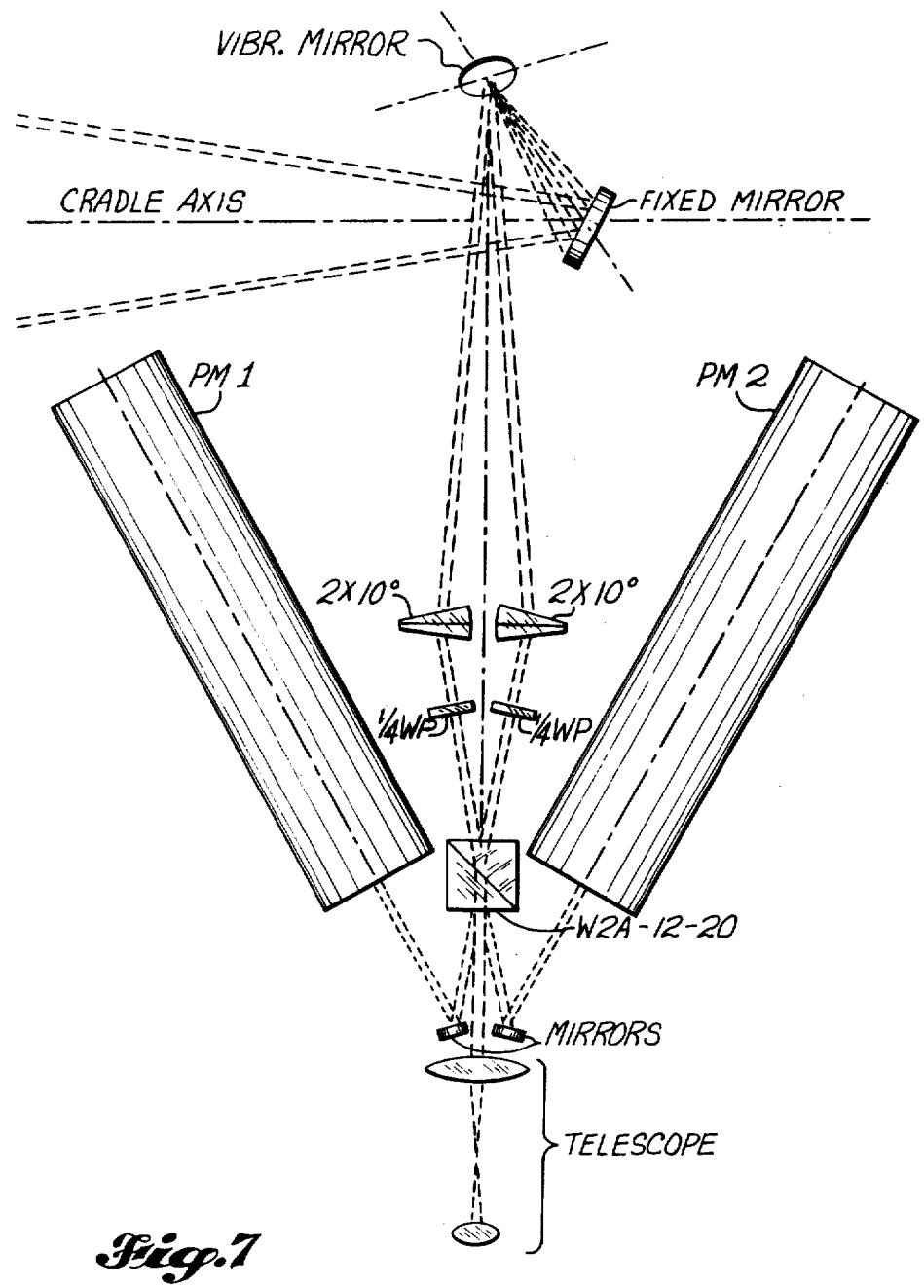
FIG. 7 is an optical schematic diagram in accordance with a second embodiment suitable for use in the present scanning angle tracking system.

A second embodiment of the present scanning angle tracker system incorporates an optical configuration as shown in FIG. 7. Here the laser output beam, again after expansion in a telescope, is split by a polarizing Wollaston prism with about 20° of angle between the two emerging beams. The prism is followed by a set of two quarter-wave plates which, together with the Wollaston prism, form an optical isolator for each beam channel. This means that the retro-reflected light, after passing through a quarter-wave plate and entering the Wollaston prism, has a plane of polarization orthogonal to the original plane of the outgoing beam. Hence, as shown in the schematic, by rotating the quarter-wave plate into one of two special orientations, the Wollaston prism becomes opaque to one of the split beams returning. This scheme can be utilized to code the two channels by polarization and to avoid cross-talk between them. The result is complete utilization of the laser power except for reflection losses which can be kept small by properly coating all components.

Also shown in FIG. 7 are 2 wedge plate pairs which can deflect the incident beam by an angle variable within ±20°. By rotation of the components in each pair the two beams are again made to intersect on the vibrating mirror.

IV.3. Signal Processor in General Block Diagram

The electronic signal processor 302 serves the task of determining the time difference between the retro-reflected signal pulses of the beam that first crosses the target tape (leading beam) and the other beam (lagging beam). The operator can interpret this time difference as the tilt angle of the test object in accordance with Eqs. (1) and (3) hereinabove. The signal processor also establishes which of the two beams crosses the tape first and hence derives a sign of the angle information.

A general block diagram of a signal processor is presented in FIG. 6. A function generator 600 generates a triangular waveform 600 which is used to drive the vibrating mirror. A square-shaped reference waveform 603 is also generated which is used to blank the retro-reflective signal during one half-cycle. Hence, the crossing of the tape by a beam is monitored always at the same edge of the tape. The reference signal is also needed to synchronize the logic 605 of the signal processor. This part consists of a dual-channel amplifier 607, pulse shaper 609, the logic 605 proper, a clock 611, a counter 613 and a D/A converter 615 for readout. The logic generates the sign of the angle information and an enable status signal 616 that turns on and off the sequence of clock pulses into counter 613. After each cycle of the deflection waveform the result of the counter is latched into the readout, and the counter is reset.

IV.3.1. First Embodiment Signal Processor

FIGS. 8A and 8B, taken together, show a circuit diagram in accordance with a first embodiment of signal processor. The function generator providing a triangular voltage to drive the mirror is coupled to the reference signal input terminal. A square wave is derived from this voltage by differentiation. The differentiating circuit limits the frequency of operation of the device to about 100–400 Hz. The relationship of the drive voltage to the pertinent signals generated in the signal processor circuit of FIGS. 8A and 8B is seen in the timing diagram of FIG. 9. A convenient component layout as an aid to implementation is shown in FIG. 10.

Type LM161 analog comparators are used for pulse shaping.

The clock utilized in this circuit embodiment comprises a 42 MHz Low Aging Crystal Oscillator with TTL output (e.g. a type ZY-7405 from Greenray Industries, Inc). For readout a 12-bit DAC with a voltage output range of −10 V to +10 V is used.

The signal processor circuit includes a high-speed TTL divided-by-16 stage following the clock. It can be used to select an effective clock rate of 42.4, 21.1, 10.5, 5.3, 2.65 MHz. So far the clock rate used has been 2.65 MHz giving an angle resolution of about 0.02° at a mirror frequency of 200 Hz in accordance with Eqs. (2) and (3) with the parameters given in the example of Sec. III.3.

Referring to FIGS. 8A and 8B, the operation of the processor is as follows: Signals 1 and 2 are the photomultiplier outputs after amplification in a dual-channel preamp (see also the block diagram of FIG. 6). They are hard-limited by the LM161 comparators, the threshold being adjustable. The resulting pulses are blanked during one half-period of the mirror drive voltage in device No. 5 (a type 74123) which is enabled by the square waveform derived from the differentiating circuit consisting of devices No. 1 and 4. The signal pulses are shortened in device No. 19, as seen in the timing diagram of FIG. 9. A logic circuit consisting of devices No. 9, 8, 16, and 17 sets one of the two flip-flops in device No. 9, depending which of the two signal pulses arrives first and correspondingly generates an up/down status representing the sense of the angle in the output of device No. 8 (pin 11). The arrival of the second pulse resets the active flip-flop (device No. 9). During the time interval between arrival of the two pulses, the clock is enabled by gate 17a/3, and the clock pulses are accepted by the 12-bit counter consisting of devices No. 10, 11, and 12. During each mirror cycle the counter output is latched once by devices 14 and 15 into the DAC (No. 20). Immediately following the latch signal, the counter is reset. LATCH and RESET are generated by a series of pulse generators consisting of devices No. 6, 13, and 10a.

IV.3.2. Second Embodiment Signal Processor

While the aforementioned first embodiment signal processor has proved to be useful for angle measurements in both the direct readout mode and the compensation mode, further improvements are shown in the second embodiment schematic circuit diagrams of FIGS. 11A and 11B. The timing signals therefor are shown in FIG. 12. The pertinent changes pinpointed for the convenience of the reader relative to the first embodiment processor are the following:

1. The quartz-controlled oscillator not only provides the clock C1 for time interval measurements, but also generates an exactly triangular wave form usable to drive the scan mirror. The frequency of the scan mirror is adjustable to $$f_M = 2^{-n} 2^{-17} f_{osc} \qquad (5)$$

where $f_{osc}$ is the quartz oscillator frequency and n=0, 1, ..., 7 the position read on a thumbwheel switch. The switch controls selection of the frequency of the clock C2 by dividing $f_{osc}$. An up/down counter accepts the pulses C2, and the counter output is continuously converted by a 8-bit DAC (e.g. a type ZD430 by Zeltex Company). The resulting analog voltage then provides the input of the mirror drive control stage.

2. For angle readings very close to zero, the pulses presetting and clearing the flip-flops in the enable logic may no longer be properly resolved. As a result, the ENABLE status may not follow the normal course, but assume the form shown as COUNT ENABLE, COINCIDENCE in FIG. 9. The time interval as read out by the instrument is then the complement of the correct result. While it is not possible to avoid COINCIDENCE at small angles, the data output latch can be inhibited so that only the normal course has an effect on the data. The second embodiment signal processor contains logic shown in FIG. 11B to effect this process which then leads to smooth transitions through zero angle. The Up/Dn status controlling the counter clock pulses C1 is also affected by the improved logic.

3. The second embodiment signal processor incorporates an output register and DAC extended from 12 to 13 bits. This makes the instrument more practical in the direct readout mode at fairly large angles. For the example given in Sec. III.3. and a count rate of 20 MHz by dividing the oscillator frequency by 2, the resolution is $\delta\alpha = 4.10^{-5}$ rad or 0.0022°, and the total angle range of the processor with 13-bit output becomes $$\alpha_{lim} = \pm 0.164 \text{ rad} = \pm 9.39°. \qquad (6)$$

IV.4. Microprocessor Interfaces

As hereinbefore indicated, a National Semiconductor Corp. SC/MP Development System was utilized for control of the cradled platform of the optical package. In Sec. V. an example will be presented of how to apply the microprocessor to the compensation mode. Two interfaces (as hereinbefore indicatedwith respect to elements 320 and 322 of FIG. 3) are required, one for communication of the SC/MP with the signal processor, referred to as IF1, and one for communication with the rotary stage controller, referred to as IF2. SC/MP is an 8-bit parallel with 16-bit addresses.

While a linear translation stage (e.g. type System 200 by Aerotech Corp.) converted to a rotary stage was utilized so that interface IF2 was designed for accepting the 12 V CMOS logic output of a controller (also by Aerotech Corp.) consisting of a 24-bit BCD word plus sign bit, and also for putting out at CMOS level the DIRECTION and CLOCK single-bit signals that are required as inputs of the controller; the present embodiment utilizes rotary stage controller, e.g. Model TL17 manufactured by Microcontrole Electronique Co. of Vitry-sur-Seine, France, which is also combined with the display counter unit (e.g. a type CV67 made by the same manufacturer) also using a 12 V level so that IF2 can also serve the rotary stage. The CV67, however, puts out a 4-bit BCD word multiplexed by 6 lines representing increasing powers of 10 plus one sign bit. Instead of CLOCK and DIRECTION the present embodiment rotary stage controller accepts a forward and a backward pulse sequence. This requires changes of the software written for the aforementioned Aerotech controller given in Sec. V.2. The aforementioned model TL17, furthermore, has additional inputs which have to be externally wired to their appropriate levels.

IV.4.1. RAM Assignments

The SC/MP Development System hereinbefore mentioned as used in the present scanning angle tracker system has been equipped with 2 read/write memory application modules ISP-8C/002 N of 2048 bytes each with the following address assignments:

| | |
|---|---|
| 1. | ISP - 8C/002 N   SN 1097 |
| | Address range 0000–07FF |

Socket 2C on the module card has been given the following jumper configuration:

|   | 6 | 5 | 4 | 3 | 2 |
|---|---|---|---|---|---|
| to | ↓ | ↓ | ↓ | ↓ | ↓ |
| 2. | 8 | 8 | 8 | 8 | 8 |
|   | ISP - 8C/002 N  SN 917 | | | | |
|   | Address range 0800–0FFF | | | | |

Jumper configuration on socket 2C:

|   | 6 | 5 | 4 | 3 | 2 |
|---|---|---|---|---|---|
| to | ↓ | ↓ | ↓ | ↓ | ↓ |
|   | 8 | 8 | 8 | 8 | 16 |

IV.4.2. Device Address Assignments

The 8131 address comparator of each interface continually compares the high-order address input (BA12–BA15) with the address assigned to the interface which is

|   | BA15 | BA14 | BA13 | BA12 |
|---|------|------|------|------|
| IF1 (Signal Processor) | 1 | 1 | 1 | 0 |
| IF2 (Stage Controller) | 1 | 1 | 1 | 1 |

Furthermore, there is a total of 2 addresses severed by IF1 and a total of 8 addresses by IF2. The assignments of the low-order addresses are as follows:

| IF1 | BA02 | BA01 | BA00 | Function |
|-----|------|------|------|----------|
| WORD 5 | 0 | 0 | 0 | STATUS + B0-B3 TIME |
| WORD 6 | 0 | 0 | 1 | B4-B11 TIME |
| IF2 | BA02 | BA01 | BA00 | Function |
| WORD 1 | 0 | 0 | 0 | DIGIT 1 of DATA |
| WORD 2 | 0 | 0 | 1 | DIGIT 2 of DATA |
| WORD 3 | 0 | 1 | 0 | DIGIT 3 of DATA |
| SIGN | 0 | 1 | 1 | SIGN of DATA |
| CLOCK PULSE LOW | 1 | 0 | 0 | LOW LEVEL of CLOCK PULSE |
| CLOCK PULSE HIGH | 1 | 0 | 1 | HIGH LEVEL of CLOCK PULSE |
| DIRECTION LOW | 1 | 1 | 0 | LOW LEVEL of DIRECTION |
| DIRECTION HIGH | 1 | 1 | 1 | HIGH LEVEL of DIRECTION |

These addresses are presently utilized as described in Secs. IV.4.3. and IV.4.4. The low-order addresses are decoded by type 74LS138 decoders.

IV.4.3. IF1-SC/MP Interface with Signal Processor

FIG. 13 shows the circuit diagram of the SC/MP interface with the signal processor. A related diagram includes FIG. 15 which represents a suggested component layout on a (single) circuit board.

On both the interface side and the processor side the connecting cable may end in a 44-pin card edge connector suited for circuit board connections.

As shown in FIG. 13, the interface connects with the SC/MP 8-bit data bus (BD00–BD07), the high- and low-order parts of the 16-bit SC/MP address bus (BA00, BA01, BA12–BA15) and with the interface IF2 for the stage controller (legended AEROTECH in FIG. 13). The connections with the (AEROTECH) interface signal circuit board are board-to-board via the card edge connectors. Both circuit boards (IF1 and IF2) are mounted in the same (Vector EFP 204-9.7) module.

Tri-state octal buffers are accepting the data and the status word from the processor (devices No. 7 and 6) and also connect to the low-order address bus (BA00, BA01). When the high-order address (BA12–BA15) matches the interface address, the 8131 address comparator is enabled and provides a low output. This produces a low on MEMSEL for address acknowledgment. The BRDS read strobe is then processed to read data out of the location specified by the low-order address.

When the high-order address is different from the assigned interface address, MEMSEL is high so that the BRDS strobe is inhibited and all outputs of the interface are held in the high-impedance (TRI-STATE) state.

The flag output BFLG2 of the SC/MP is used to reset the 7474 flip-flop (device No. 4) which is set by a low on COINC from the signal processor. The flip-flop output in turn sets ASENSE high provided the gate 8123 (device No. 9) is enabled by INDBG from the SC/MP.

IV.4.4 IF2-SC/MP Interface with Stage Controller

FIG. 14 shows the circuit diagram of the SC/MP interface with the (AEROTECH) stage controller. The component layout is illustrated in FIG. 16, and the notations for the connecting cables between interface and controller (upper part) and between interface and SC/MP (lower part), respectively are summarized below:

| ATJ2 | CABLE WIRE |   |
|------|------------|---|
| 2 | RED-BLACK | |
| 3 | YELLOW-WHITE | |
| 4 | WHITE-GREEN | |
| 5 | RED-BROWN | |
| 6 | WHITE-RED | |
| 7 | YELLOW-PURPLE | |
| 8 | YELLOW-GREEN | |
| 9 | YELLOW-BLUE | |
| 10 | YELLOW-RED | SAME ON OTHER END |
| 11 | GREEN-BROWN | |
| 12 | YELLOW-BLACK | |
| 13 | RED-ORANGE | |
| 14 | YELLOW-BROWN | |
| 15 | RED | |
| 16 | RED-WHITE | |
| 17 | BLACK | |
| 18 | YELLOW | |
| 19 | YELLOW-ORANGE | |
| 20 | WHITE-BLACK | |
| 21 | RED-BLUE | |
| 22 | WHITE-ORANGE | |
| 23 | WHITE-BROWN | |
| 24 | BLUE-YELLOW | |
| 25 | GREEN-BROWN (LIGHT) | |
| 26 | GREEN-BROWN (DARK) | |
| 27 | — | |
| 28 | PURPLE | |

The cable connecting the interface module with the SC/mp has notations shown in FIG. 14. The connector shown on the interface is a 44-pin card edge connector ELCO 00-6007-044-980-002. Pins with letters A to Z are used. The connector shown on the SC/mp is a type CINCH 57-30360 with pins numbered from 1 to 36. Also shown there are the SC/MP notations of the connectors J6, J7, and TB1 on the SC/MP panel.

Separate leads with BNC connectors are used for DIRECTION and CLOCK from the interface module to the (AEROTECH) controller.

As seen in FIG. 14, the interface connects to the SC/MP 8-bit data bus (BD00–BD07), to the low-order address bus (BA00–BA02), and to the high-order address bus (BA12–BA15). It also generates sense input ASENSE and the address acknowledgement signal MEMSEL, and accepts the read strobe BRDS, the interrupt enable INDBG, and the SC/MP flag output BFLG2. Depending on the low-order address, the flip-flops for the DIRECTION and CLOCK signals are set, or reset, respectively. Furthermore, the 25-bit output of the Aerotech state controller is held in three octal buffers (devices No. 6, 7, 8) and one additional single buffer (the sign) which can be read into the SC/MP via separate addresses (see Sec. IV.4.1.). The output RESET is not presently used.

The operation of the interface logic is the same as described in SEC. IV.4.2

While the interface has been designed to serve the Aerotech stage controller (200 Series Translator), its capabilities can be applied to any system putting out digital information of up to 25 bits and receiving 2 separate control signals of 1 bit each. As presently applied, the interface uses inverting buffers for CMOS to TTL level conversion of the stage controller output and TTL to MOS inverters for driving DIRECTION and CLOCK. The new rotary stage controller is expected to be interfaced with either no change at all or only minor additions. It may be necessary, for example, to provide DIRECTION* and CLOCK* as separate outputs. Furthermore, the rotary stage controller output uses multiplexing so that only part of the 25-bit TRI-STATE buffer is required.

V. SOFTWARE DESCRIPTION

For completeness, an applications program that has been written which puts the present scanning angle tracker interfaced with the SC/MP Development System into the compensation mode is herein shown. It is assumed that a Teletype printer is also connected to SC/MP.

V.1. Loading and Executing the Applications Program

The program is detailed in Secs. V.2.–V.4. It is loaded via the paper tape reader by the following steps: Initialize (press red button on the SC/MP panel). The TTY will then print

C10001

–

The hyphen here is the prompt sign. Now load paper tape and follow by typing L CR CR means push RETURN. After the tape is loaded and the prompt sign is printed, a listing of the program in machine code can be obtained by typing T0310:04B8 CR which results in the hexadecimal printout shown in Sec. V.2.4. Further details of this application program are presented in the following sections.

To run the program, type G0310 CR.

V.2. Application Program for Compensation Mode

The present program written to implement th  ompensation mode of the present scanning angle t   :er system requires only minimum machine-operatoi  :r-action. The following sections are descriptions of the program.

V.2.1 Short Flow Diagram

In FIG. 17 the application program is presented in the form of a condensed flow diagram. This diagram shows that the program is divided into two parts. The first part is the main program, while the second part constitutes the interrupt service following COINCIDENCE (COINC). This signal is generated in the signal processor (see p. 34) when the two reflection signal pulses coincide within a pulse width. As shown in the signal processor schematic diagram, FIG. 8B, COINC is asserted in the output of the gate 17a/2, when COUNT ENABLE assumes a high level during LATCH time. As seen in the timing diagram, FIG. 9, this is only the case when th two signal pulses overlap.

The main program controls the motor of the rotary stage so that the cradle is tilted until it is parallel to the retro-reflective tape. It also initiates the interaction with the user as shown in the detailed flow diagram, Sec. V.2.2.

When the cradle is parallel to the retro-reflective tape, COINC causes an interrupt request, and the program branches into its second part, the interrupt service. The motor is stopped, a check is carried out to sense whether COINCIDENCE persists, and the readout of the stage controller is transferred to the teletype (TTY). The program then scans the register containing the TIME DIFFERENCE ΔT between the two reflections and compares the value with a programmable value RANGE. Should ΔT exceed RANGE owing to the target motion, the program returns to the main part and the motor is again turned on. The cradle is again tilted in order to approach parallel orientation.

V.2.2 Detailed Flow Diagram

Figure 21:
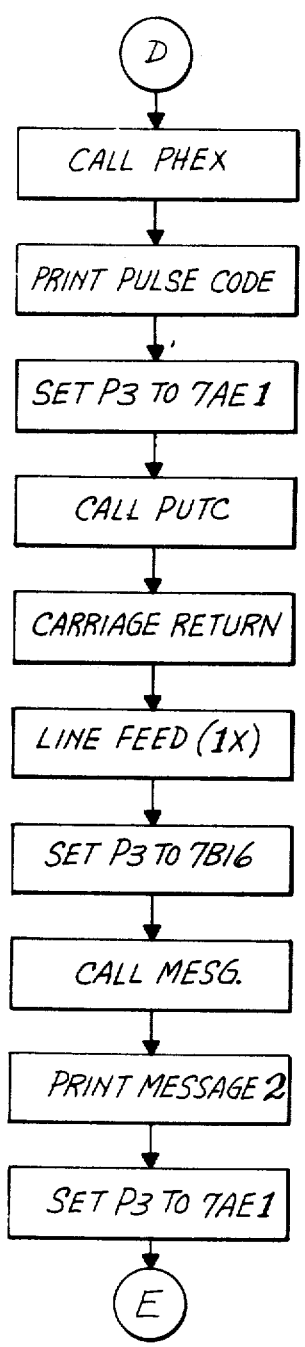
Figure 22:
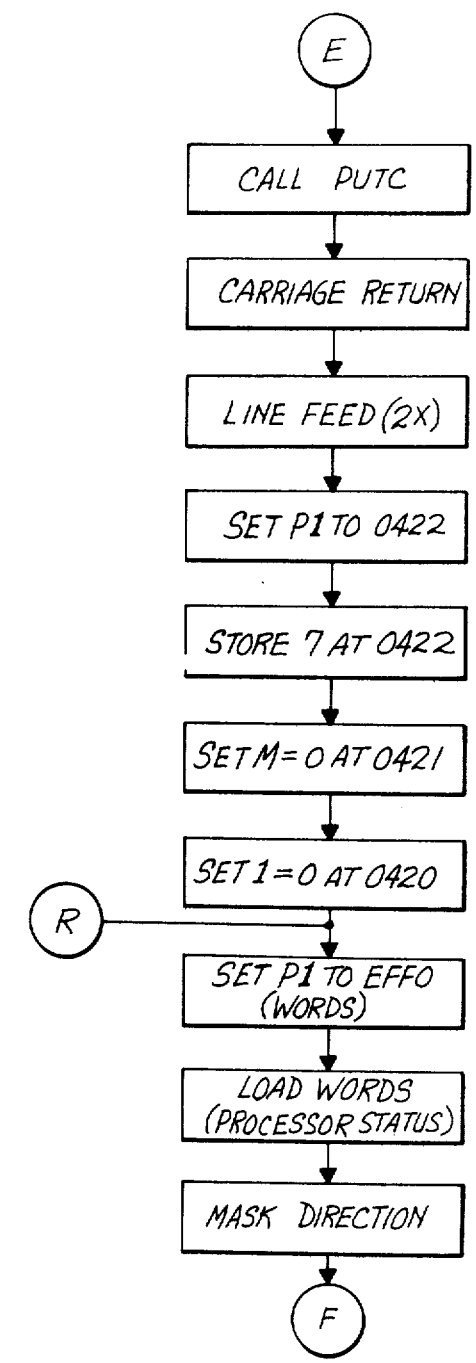
Figure 23:
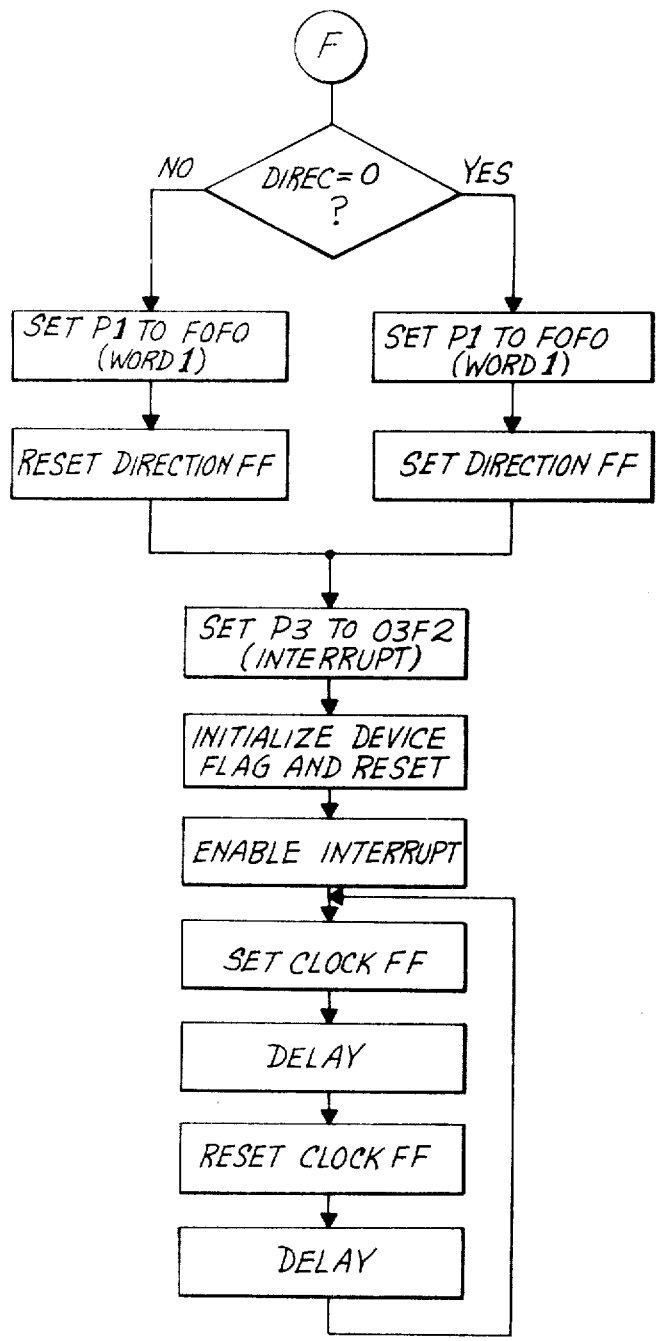
Figure 24:
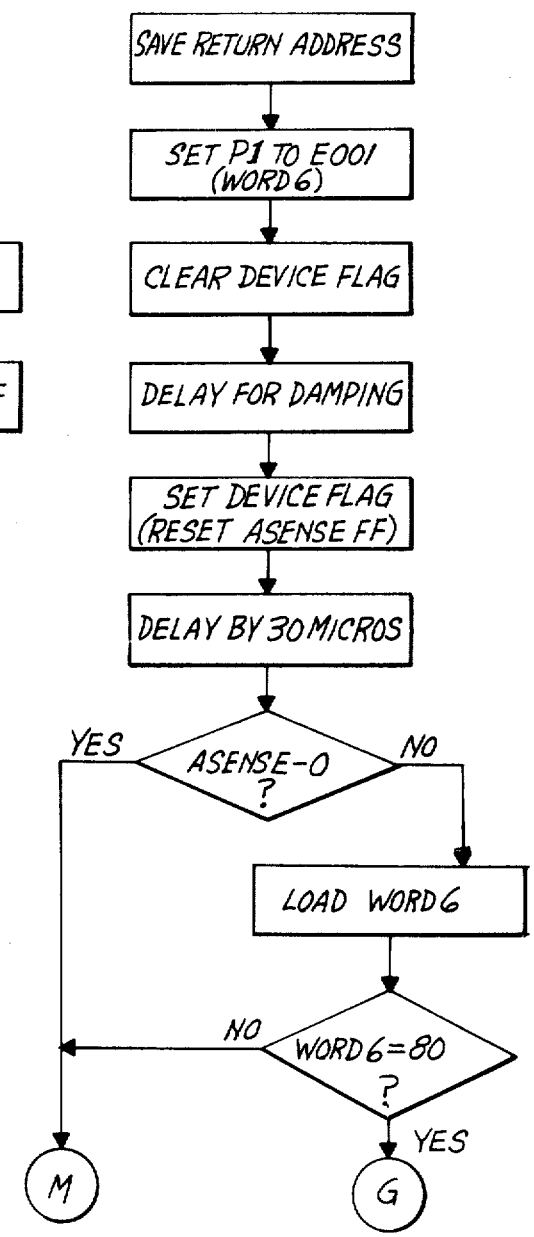
Figure 25:
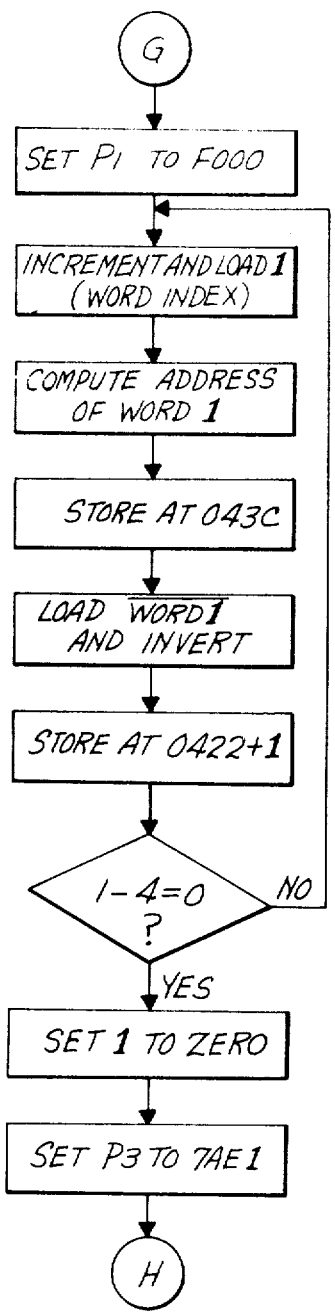
Figure 26:
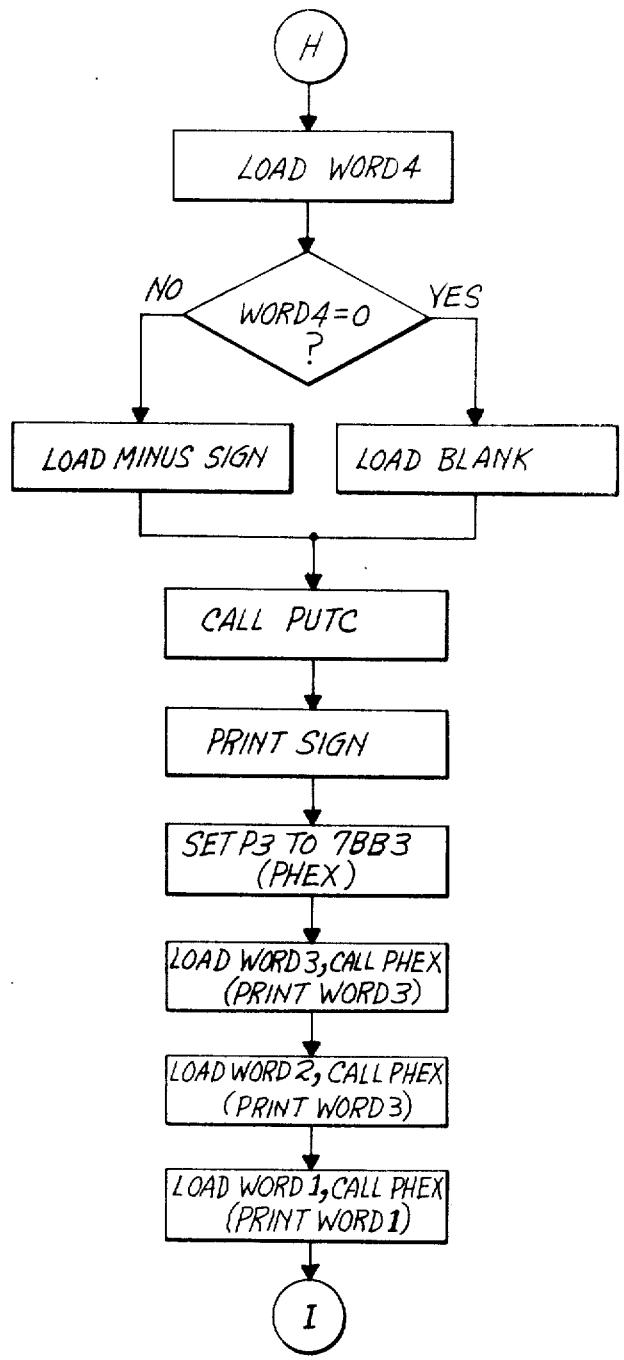
Figures 27, 28:
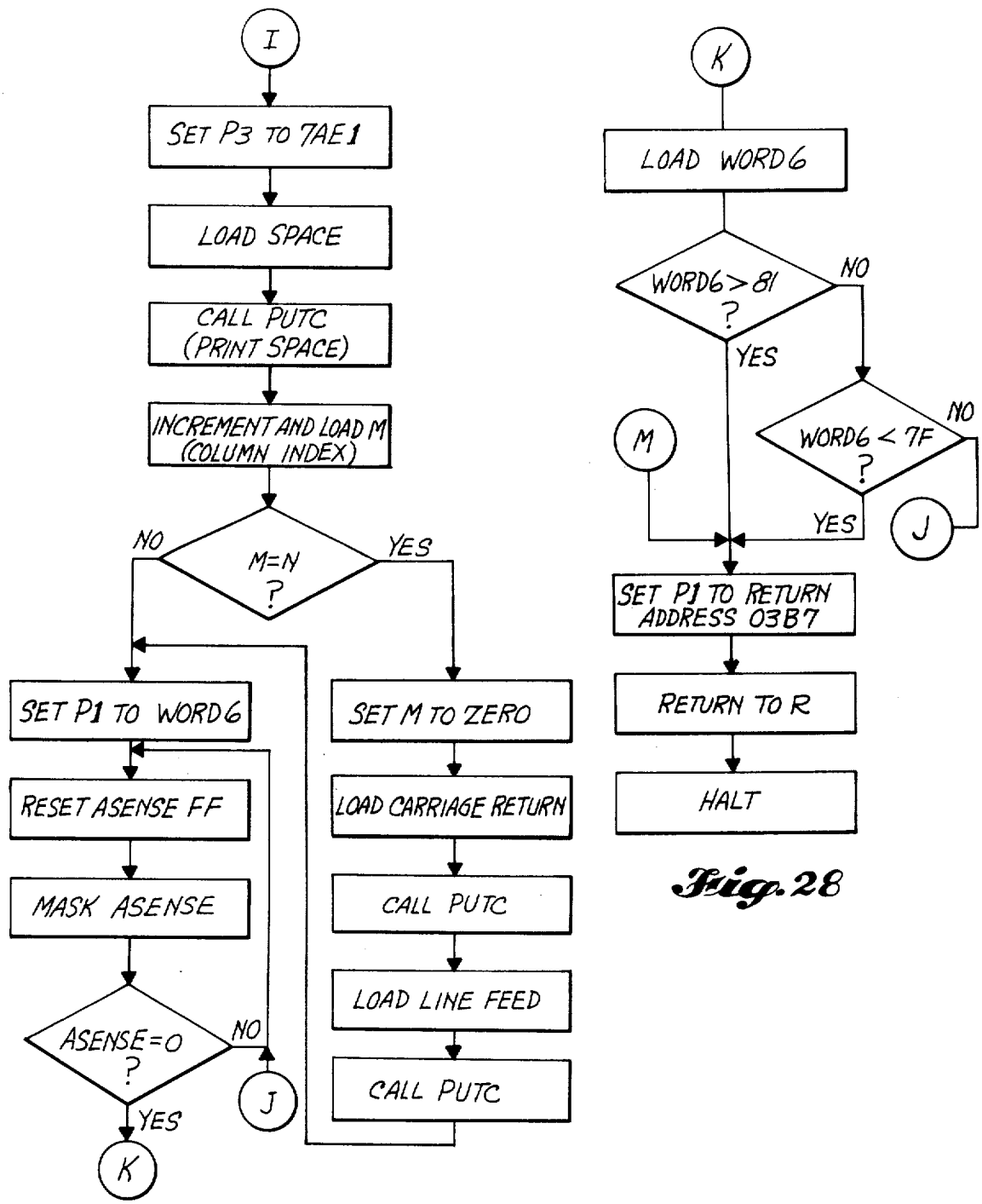

In detail  ne program proceeds as shown in FIG. 21. The corresponding instructions in assembly language are listed in Sec. V.2.3 A map of the memory locations is given below:

| LOCATION | CONTENTS |
| --- | --- |
| 0220 | J (MESSAGE INDEX) |
| 0221 | L (RESERVE) |
| 0222 | P (PULSE RATE CODE) |
| . | |
| . | UNUSED |
| . | |
| 023F | |
| 0240 | MESSAGE 1 |
| 027F | |
| 0280 | MESSAGE 2 |
| 02BF | |
| 02C0 | MESSAGE 3 |
| 02FF | |
| 0300 | SOFTWARE STACK FOR ROUTINES |
| 030F | |
| 0310 | APPLICATIONS PROGRAM, START |
| . | |
| . | |
| 0362 | PULSE RATE CODE |
| . | |
| . | |
| 03B8 | RETURN ADDRESS |
| . | |
| . | |
| 03F3 | INTERRUPT SERVICE |
| . | |
| . | |
| 0420 | I (WORD INDEX) |

-continued

| LOCATION | CONTENTS |
|---|---|
| 0421 | M (COLUMN INDEX) |
| 0422 | N (COLUMN CAPACITY) |
| 0423 | WORD1 |
| 0424 | WORD2 |
| 0425 | WORD3 |
| 0426 | WORD4 |
| . | |
| . | |
| . | |
| 04B8 | HALT |
| Exx1 | WORD5 |
| Exx2 | WORD6 |
| Fxx0 | WORD1 |
| Fxx1 | WORD2 |
| Fxx2 | WORD3 |
| Fxx3 | WORD4 |

As shown above, locations (hexadecimal notation will be used throughout for memory locations et cet.) 0220, 0221, 0222 are reserved for J (MESSAGE index), L (RESERVE), and P (PULSE RATE CODE), respectively. The program first sets P1, one of the three pointers available for memory and peripheral device addressing in SC/MP, to location 0220. Zeros are then stored at 0220 and 0221, and P1 is set to location 0240 which is the first location of an area set aside in memory for messages to be put in by the user. Pointer P2, used mostly as a stack pointer, is then set to 030F which is the high-order address of a software stack used for subroutines provided by the SC/MP firmware. Pointer P3, used mostly as a subroutine pointer, is now set to 7A90 which is the call address of GECHO, a subroutine which receives one ASCII character from the TTY keyboard and echoes the character back to TTY for printout. This is the first step of the interactive part of the program requiring the user to type 3 consecutive messages of 62 characters maximum length, each message ended by a semicolon ;. These messages can be alphanumeric input such as the headings for the printout field, test log comments, etc. Each character is stored at the location at which P1 has been set previously (the first message at 0240). All characters can be admitted except the semicolon ; which is reserved as a means to end the message. As seen in the flow diagram, each message is immediately followed by a space and a Null (00). The latter is used to end the MESG subroutine printing out the message on the TTY later in the program.

After three messages are stored in the field 0240–02FF, pointer P1 is set to 0222, the location of the pulse code, and the appropriate value is stored (default value is 03). The meaning of PULSE CODE is explained further below by Eq. (7). It controls the length of the stepping pulses put into the rotary stage motor. PULSE CODE is also stored at location 03E2.

The subroutine pointer P3 is now set to 7AE1, the call address of PUTC, a subroutine that causes the TTY to print out the ASCII character corresponding to the contents of the SC/MP Accumulator. A carriage return and 3 line feed operations follow. After that P3 is set to 7B16, the call address of MESG, a subroutine which prints out an ASCII message on the TTY. Then MESSAGE1 which was previously stored in the area 0240–027F, is printed followed by the PULSE CODE value. This requires first setting P3 to 7BB3 (the call address of PHEX, a subroutine printing a 2-digit value present in the accumulator), to load PULSE CODE, and then to call PHEX.

After carriage return and line feed, MESSAGE2 is printed followed by carriage return and 2 line feed operations. MESSAGE3 is not printed in the present program. Hence, it suffices to put in MESSAGE3 as simply a semicolon ;.

The program now proceeds to set up the format in which angle data are printed by the TTY. To this end the value 7 is stored into memory location 0422, and zeros are stored at 0420 and 0421. The printed field will then be made up of 7 columns. Locations 0420–0426 are reserved for the word index I, the column index M, the column capacity N (which is given the value 7), and the values of WORD1, ..., WORD4 (see map, FIG. 24). These variables are necessary for the control of the printout of the angle data, each value consisting of 3 BCD 8-bit words WORD1 to WORD3 plus sign WORD4 put out by the rotary stage controller.

Pointer 1 is now set to the address of WORD5 at location EFF0. The 8 bits of WORD5 represent, beginning at the LSB,

| | |
|---|---|
| CNTEN | (COUNT ENABLE) |
| DIREC | (DIRECTION) |
| UPDN | (UP-DOWN STATUS of counter in signal processor) |
| B0 | |
| B1 | (Low-order bits of TIME DIFFERENCE) |
| B2 | |
| B3 | |

The 4 lower bits of WORD5 are called PROCESSOR STATUS or STATUS for brevity. Individual bits can be operated on after masking one or several bits in WORD5. The program, after loading WORD5, proceeds to mask DIREC. P1 is set to F0F0, the address of DIGIT1 (WORD1) of the BCD data put out by the stage controller. Depending on DIREC (representing the sense of rotation DIRECTION of the rotary stage), flip-flop 17/1 of IF2 (see FIG. 14) is either set (address F006) or reset (Address F007). This branch selects the appropriate input channel of the rotary stage motor.

The subroutine pointer P3 is now set to the interrupt address 03F2, the device flag BFLG2 is initialized and reset. As seen in FIG. 13, BFLG2 clocks flip-flop 4 of IF1 into the low state. The flip-flop is then ready to be set by COINC. As a result, TRI-STATE signal ASENSE in the output of the data selector 9 goes high, causing an interrupt request.

After preparing for an interrupt, the program generates inputs to the stage controller which result in motor pulses of a programmable frequency. Changes can be introduced by varying PULSE CODE by the DELAY instruction whose operand denotes a multiple of $2^{10}$ microcycles. Hence, the halfperiod of a motor pulse sequence can be determined from the formula $$\text{delay} = 13 + 2(\text{ACC}) + 2^{10}\,\text{DISP microcycles} \quad (7)$$

where (ACC) denotes the contents of the accumulator and DISP the operand of the DELAY instruction. One microcycle equals 2 microseconds in the SC/MP. An operand of 02 then causes a delay of 2.074 ms, if (ACC)=00.

The result of the program so far is to tilt the cradle continuously at a rate determined by the motor pulse frequency in a rotation sense that will eventually orient the cradle parallel to the retro-reflective tape. When that happens, COINC goes high, ASENSE goes high, and interrupt occurs. The program then continues with the interrupt service.

When interrupt occurs, the SC/MP automatically clears bit 3 in its status register (the interrupt enable flag IE), the contents of the program counter PC is exchanged with the contents of pointer P3 (this will save the return address), and the instruction at the location specified by the new (PC)+1 is executed. In the present program this means that P1 is set to E001, the address of WORD6 which represents the upper 8 bits of TIME DIFFERENCE. The device flip-flop is reset after some delay in order that the response of the program to an intermittent retriggering of the device flip-flop does not immediately restart the motion of the cradle. This delay, therefore, introduces damping into the mechanical response of the cradle to the target motion. The operator of the instrument should pay attention to this feature and vary it according to his requirements.

Bit 4 of the SC/MP STATUS register represents ASENSE which is used in the present program to request an interrupt (provided bit 3 has been set to enable interrupt). ASENSE must be tested repeatedly by masking the STATUS register. The interrupt service proceeds to test ASENSE and to branch as shown in the flow diagram. If ASENSE=0, one may conclude that the COINC signal that caused the interrupt, was intermittent and does not indicate stable COINCIDENCE where both returning light signal pulses overlap continuously. It is then necessary to RETURN and to start over again by tilting the cradle in the correct direction. Otherwise COINCIDENCE is asserted, and it is now necessary to acquire the angle data and to print them on the TTY. The necessary steps are shown in the flow diagram. First, if everything is in order at this time, the upper 8 bits of TIME DIFFERENCE should read 80, indicating that the value of $\Delta T$ is zero within the upper eight bits (the DAC in the output of the signal processor is biased to an output of zero with an input of 800 on its 12 bits). If not, the interrupt was due to a spurious or erroneous signal, and the program goes to RETURN. If TIME DIFFERENCE=80, pointer P1 is set to F000, the address of the register of WORD1. This word and also WORD2-WORD4 are presented to the SC/MP in inverted form because of the inverting level converters MM74C901 on IF2 (see FIG. 14). The program steps shown in the flow diagram first increment the word index and then store the values of WORD1 to WORD4 after reinversion in the appropriate locations (0423-0426). After testing for the end of the loop with index I, P3 is set to 7AE1, the call address of PUTC which then is called to print WORD4, either the minus sign or a blank (space). After that P3 is set to 7BB3, the call address of PHEX, and the data are printed in the sequence WORD3, WORD2, WORD1, SPACE (the latter by calling PUTC). Then the column index M is incremented, and M is compared with N (equal to 7 in the present program). If M is not equal to N, P1 is set to E001, the address of WORD6. If M equals N, a carriage return and one line feed are first executed in preparation for the next line of data. The program then resets the ASENSE flip-flop, masks ASENSE in the STATUS register, and then tests ASENSE. If the result is 1, then COINCIDENCE still persists, and the program continues testing in a loop. If, on the other hand, ASENSE=0, the target has moved relatively to the cradle. In the present program, the cradle is then permitted to be tilted again, provided bit 0 in WORD6 (TIME DIFFERENCE) has changed from 0 by $\pm$. Hence, the amount of hysteresis is equal to an angle corresponding to 16 pulses counted in the signal processor. If the resolution per pulse is 0.018° (see Sec. III.3.), the hysteresis is about 0.3°. This value can be changed and adapted to the requirements. As shown in the flow diagram, TIME DIFFERENCE loaded as WORD6 is first compared with 81. If it exceeds 81, the program returns by means of P1 to the RETURN address 03B7. Otherwise, WORD6 is compared with 7F. If it exceeds 7F, the program loops back to scan ASENSE again. Otherwise, RETURN follows.

This concludes the description of the flow diagram.

V.2.3. Assembly Language Program

The flow diagram just described is realized by the following instruction sequence, preceded by a few allocations in memory:

| 0220 | J (MESSAGE INDEX) | | |
|---|---|---|---|
| 0221 | L (RESERVE) | | |
| 0222 | P (PULSE RATE CODE) | | |
| . | | | |
| . | | | |
| . | | | |
| 0310 LDI 20 | C420 | | |
| 0312 XPAL 1 | 31 | SET P1 to 0220 | |
| 0313 LSI 02 | C402 | | |
| 0315 XPAH 1 | 35 | | |
| 0316 LDI 00 | C400 | STORE 0 AT 0220 | |
| 0318 ST@ 01 (P1) | CD01 | AND INCREMENT ADDRESS | |
| 031A ST@ 1F (P1) | CD1F | STORE 0 AT 0221 AND SET P1 TO 0240 | |
| 031C LDI 0F | C40F | | |
| 031E XPAL 2 | 32 | SET P2 TO HOA OF SOFTWARE STACK | |
| 031F LDI 03 | C403 | | |
| 0321 XPAH 2 | 36 | | |
| 0322 LDI 90 | C490 | | |
| 0324 XPAL 3 | 33 | SET P3 TO GECHO CALL ADDRESS 7A90 | |
| 0325 LDI 7A | C47A | | |
| 0327 XPAH 3 | 37 | SET P3 TO GECHO CALL ADDRESS 7A90 | |
| 0328 XPPC 3 | 3F | CALL GECHO | |
| 0329 ST@ 01 (P1) | CD01 | STORE CHARACTER AT 0240 AND INCREMENT (P1) | |
| 032B SCL | 03 | SET CY/L | |
| 032C CAI BB | FCBB | (AC) (AC) - BB | |
| 032E JNZ F8 | 9CF8 | IF(AC) $\neq$ 0, GO TO 0328 | |
| 0330 LDI 20 | C420 | LOAD SPACE | |
| 0332 STFF(P1) | C9FF | STORE SPACE AT LAST ENTRY | |

-continued

| | | |
|---|---|---|
| 0334 LDI 00 | C400 | LOAD ZERO |
| 0336 ST00(P1) | C900 | STORE ZERO AT FOLLOWING ENTRY |
| 0338 LDI 20 | C420 | |
| 033A XPAL 1 | 31 | SET P1 TO 0220 |
| 033B LDI 02 | C402 | |
| 033D XPAH 1 | 35 | |
| 033E SCL | 03 | SET CY/L |
| 033F ILD00(P1) | A900 | INCREMENT AND LOAD (0220) |
| 0341 CAI 01 | FC01 | J-1 |
| 0343 JNZ 08 | FC08 | IF J-1 ≠ 0, GO TO 034D |
| 0345 LDI 80 | C480 | |
| 0347 XPAL 1 | 31 | SET P1 TO 280 |
| 0348 LDI 02 | C402 | |
| 034A XPAH 1 | 35 | |
| 034B JMP DB | 90DB | GO TO 328 |
| 034D CAI 01 | FC01 | J-2 |
| 034F JNZ 08 | 9C08 | IF J-2 ≠ 0, GO TO 0359 |
| 0351 LDI C0 | C4C0 | |
| 0353 XPAL 1 | 31 | SET P1 TO 02C0 |
| 0354 LDI 02 | | |
| 0356 XPAH 1 | 35 | SET P1 TO 02C0 |
| 0357 JMP CF | 90CF | GO TO 0328 |
| 0359 LDI 22 | C422 | |
| 035B XPAL 1 | 31 | SET P1 TO 0222 (LOCATION OF PULSE RATE CODE) |
| 035C LDI 02 | C402 | |
| 035E XPAH 1 | 35 | |
| 035F NOP | 08 | NO OPERATION |
| 0360 NOP | 08 | NO OPERATION |
| 0361 LDI 03 | C403 | LOAD 03 |
| 0363 ST00(P1) | C900 | STORE 03 AT 0222 |
| 0365 ST7C | C87C | STORE 03 ALSO AT 03E2 |
| 0367 LDI E1 | C4E1 | |
| 0369 XPAL 3 | 33 | SET POINTER 3 TO PUTC |
| 036A LDI 7A | C47A | |
| 036C XPAH 3 | 37 | |
| 036D LDI 0D | C40D | LOAD CARRIAGE RETURN |
| 036F XPPC 3 | 3F | CALL PUTC |
| 0370 LDI 0A | C40A | LOAD LINE FEED |
| 0372 XPPC 3 | 3F | CALL PUTC |
| 0373 XPPC 3 | 3F | CALL PUTC |
| 0374 XPPC3 | 3F | CALL PUTC |
| 0375 LDI 16 | C416 | |
| 0377 XPAL 3 | 33 | SET P3 TO MESG |
| 0378 LDI 7B | C47B | |
| 037A XPAH 3 | 37 | |
| 037B XPPC 3 | 3F | |
| 037C | 02 | CALL MESG (MESSAGE1) |
| 037D | 40 | |
| 037E LDI B3 | C4B3 | |
| 0380 XPAL 3 | 33 | SET P3 to PHEX |
| 0381 LDI 7B | C47B | |
| 0383 XPAH 3 | 37 | |
| 0384 LD00(P1) | C100 | LOAD PULSE RATE CODE |
| 0386 XPPC 3 | 3F | CALL PHEX |
| 0387 LDI E1 | C4E1 | |
| 0389 XPAL 3 | 33 | SET P3 TO PUTC |
| 038A LDI 7A | C47A | |
| 038C XPAH 3 | 37 | |
| 038D LDI 0D | C40D | LOAD CARRIAGE RETURN |
| 038F XPPC 3 | 3F | CALL PUTC |
| 0390 LDI 0A | C40A | LOAD LINE FEED |
| 0392 XPPC 3 | 3F | CALL PUTC |
| 0393 LDI 16 | C416 | |
| 0395 XPAL 3 | 33 | SET P3 TO MESG |
| 0396 LDI 7B | C47B | |
| 0398 XPAH 3 | 37 | |
| 0399 XPPC 3 | 3F | |
| 039A | 02 | CALL MESG (MESSAGE2) |
| 039B | 80 | |
| 039C NOP | 08 | NO OPERATION |
| 039D NOP | 08 | NO OPERATION |
| 039E LDI E1 | C4E1 | |
| 03A0 XPAL 3 | 33 | SET P3 TO PUTC |
| 03A1 LDI 7A | C47A | |
| 03A3 XPAH 3 | 37 | |
| 03A4 LDI 0D | C40D | LOAD CARRIAGE RETURN |
| 03A6 XPPC 3 | 3F | CALL PUTC |
| 03A7 LDI 0A | C40A | LOAD LINE FEED |
| 03A9 XPPC 3 | 3F | CALL PUTC |
| 03AA XXPC 3 | 3F | CALL PUTC |

-continued

| | | |
|---|---|---|
| 03AB LDI 04 | C404 | |
| 03AD XPAH 1 | 35 | SET P1 TO 0422 |
| 03AE LDI 07 | C407 | LOAD 7 |
| 03B0 STOO(P1) | C900 | STORE 7 AT 0422 |
| 03B2 LDI 00 | C400 | |
| 03B4 STFF(P1) | C9FF | SET I AND M TO ZERO, (0421) AND (0422) |
| 03B6 STFE(P1) | C9FE | |
| 03B8 LDI F0 | C4F0 | |
| 03BA XPAL 1 | 31 | SET P1 WORD5 AT EFF0 |
| 03BB LDI EF | C4EF | |
| 03BD XPAH 1 | 35 | |
| 03BE LD00(P1) | C100 | LOAD WORDS |
| 03C0 ANI 02 | D402 | MASK DIRECTION |
| 03C2 JNZ 07 | 9C07 | IF DIREC ≠ 0, GO TO 03CB |
| 03C4 LDI F0 | C4F0 | |
| 03C6 XPAH 1 | 35 | SET P1 TO F0F0 |
| 03C7 LDO6(P1) | C106 | SET DIREC (F006) (ROTATE IN POSITIVE SENSE) |
| 03C9 JMP 05 | 9005 | GO TO 03D0 |
| 03CB LDI F0 | C4F0 | |
| 03CD XPAH 1 | 35 | SET P1 TO F0F0 |
| 03CE LDO7(P1) | C107 | RESET DIREC (F007) (ROTATE IN NEGATIVE SENSE) |
| 03D0 LDI F2 | C4F2 | |
| 03D2 XPAL 3 | 33 | SET P3 TO INTERRUPT ADDRESS 03F2 |
| 03D3 LDI 03 | C403 | |
| 03D5 XPAH 3 | 37 | |
| 03D6 CSA | 06 | |
| 03D7 ANI FB | D4FB | RESET BFLG2 (INITIALIZE DEVICE FLAG) |
| 03D9 CAS | 07 | |
| 03DA CSA | 06 | |
| 03DB ORI 04 | DC04 | SET BFLG2 (RESET DEVICE FLAG) |
| 03DD CAS | 07 | |
| 03DE IEN | 05 | ENABLE INTERRUPT |
| 03DF LDO4(P1) | C104 | SET CLOCK (F004) |
| 03E1 DLY ** | 8F** | DELAY BY PULSE RATE CODE |
| 03E3 LDO5(P1) | C105 | RESET CLOCK (F005) |
| 03E5 LD FC | C0FC | LOAD PULSE RATE CODE |
| 03E7 ST 02 | C802 | STORE AT 03EA |
| 03E9 DLY ** | 8F** | DELAY BY PULSE RATE CODE |
| 03EB JMP F2 | 90F2 | JUMP TO 03DF |
| | | INTERRUPT SERVICE |
| 03F1 | | LO INTERRUPT ADDRESS |
| 03F2 | | HI INTERRUPT ADDRESS |
| 03F3 XPAL 3 | 33 | EXCHANGE P3 LOW |
| 03F4 ST FC | C8FC | STORE AT 03F1 |
| 03F6 XPAH 3 | 37 | EXCHANGE P3 HIGH |
| 03F7 ST FA | C8FA | STORE AT 03F2 |
| 03F9 LDI 01 | C401 | |
| 03FB XPAL 1 | 31 | SET P1 TO E001 |
| 03FC LDI E0 | C4E0 | |
| 03FE XPAH 1 | 35 | |
| 03FF CSA | 06 | |
| 0400 ANI FB | D4FB | INITIALIZE DEVICE FLAG |
| 0402 CAS | 07 | |
| 0403 DLY 50 | 8F50 | DELAY BY 50 (DAMPING) |
| 0405 CSA | 06 | |
| 0406 ORI 04 | DC04 | RESET DEVICE FLAG |
| 0408 CAS | 07 | |
| 0409 DLY 00 | 8F00 | DELAY BY 00 |
| 040B CSA | 06 | COPY STATUS |
| 040C ANI 10 | D410 | MASK ASENSE |
| 040E JZ 17 | 9817 | IF ASENSE = 0, GO TO 0427 |
| 0410 SCL | 03 | SET CY/L |
| 0411 LDOO(P1) | C100 | LOAD WORDS |
| 0413 CAI 80 | FC80 | WORD6 - 80 |
| 0415 JZ 12 | 9812 | IF WORD6 - 80 = 0, GO TO 0429 |
| 0417 JMP OE | 900E | GO TO 0427 |
| 0419 NOP | 08 | NO OPERATION |
| 041A CAI 7F | FC7F | WORD6 - 7F |
| 041C JZ 0B | 980B | IF WORD6 - 7F = 0, GO TO 0429 |
| 041E JMP 07 | 9007 | GO TO 0427 |
| 0420 | | I (WORD INDEX) |
| 0421 | | M (COLUMN INDEX) |
| 0422 | | N (COLUMN CAPACITY) |
| 0423 | | WORD1 |

-continued

| | | |
|---|---|---|
| 0424 | | WORD2 |
| 0425 | | WORD3 |
| 0426 | | WORD4 |
| 0427 JMP 67 | 9067 | GO TO 0490 |
| 0429 LDI 00 | C400 | |
| 042B XPAL 1 | 31 | SET P1 TO F000 |
| 042C LDI F0 | C4F0 | |
| 042E XPAH 1 | 35 | |
| 042F CCL | 02 | CLEAR CY/L |
| 0430 ILD EF | A8EF | INCREMENT AND LOAD I |
| 0432 ADI E6 | F4E6 | E6 + I |
| 0434 ST 07 | C807 | STORE COMPUTED DISPLACEMENT AT 043C |
| 0436 CCL | 02 | CLEAR CY/L |
| 0437 LDI 00 | C400 | LOAD ZERO |
| 0439 CAD@01(P1) | FD01 | INVERT WORD1 AND INCREMENT P1 |
| 043B ST ** | C8** | STORE AT 0422 + I |
| 043D NOP | 08 | NO OPERATION |
| 043E NOP | 08 | NO OPERATION |
| 043F SCL | 03 | SET CY/L |
| 0440 LD DF | C0DF | LOAD I |
| 0442 CAI 04 | FC04 | I - 4 |
| 0444 JNZ E9 | 9CE9 | IF I - 4 ≠ 0, GO TO 042F |
| 0446 LDI 00 | C400 | |
| 0448 ST D7 | C8D7 | SET I TO ZERO |
| 044A LDI E1 | C4E1 | |
| 044C XPAL 3 | 33 | SET P3 TO PUTC |
| 044D LDI 7A | C47A | |
| 044F XPAH 3 | 37 | |
| 0450 LD D5 | C0D5 | LOAD WORD4 |
| 0452 JNZ 04 | 9C04 | IF WORD4 ≠ 0, GO TO 0458 |
| 0454 LDI 2D | C42D | LOAD -SIGN |
| 0456 JMP 02 | 9002 | GO TO 045A |
| 0458 LDI 20 | C420 | LOAD SPACE |
| 045A XPPC 3 | 3F | CALL PUTC |
| 045B LDI B3 | C4B3 | |
| 045D XPAL 3 | 33 | SET P3 TO PHEX |
| 045E LDI 7B | C47B | |
| 0460 XPAH 3 | 37 | |
| 0461 LD C3 | C0C3 | LOAD WORD3 |
| 0463 XPPC 3 | 3F | CALL PHEX |
| 0464 LD BF | C0BF | LOAD WORD2 |
| 0466 XPPC 3 | 3F | CALL PHEX |
| 0467 LD BB | C0BB | LOAD WORD1 |
| 0469 XPPC 3 | 3F | CALL PHEX |
| 046A NOP | 08 | |
| 046B NOP | 08 | NO OPERATION |
| 046C NOP | 08 | |
| 046D NOP | 08 | |
| 046E LDI E1 | C4E1 | |
| 0470 XPAL 3 | 33 | SET P3 TO PUTC |
| 0471 LDI 7A | C47A | |
| 0473 XPAH 3 | 37 | |
| 0474 LDI 20 | C420 | LOAD SPACE |
| 0476 XPPC 3 | 3F | CALL PUTC |
| 0477 SCL | 03 | SET CY/L |
| 0478 ILD A8 | A8A8 | INCREMENT AND LOAD M |
| 047A CAD A7 | F8A7 | M - N |
| 047C JNZ 0A | 9C0A | IF M - N ≠ 0, GO TO 0488 |
| 047E LDI 00 | C400 | |
| 0480 ST A0 | C8A0 | SET M TO ZERO |
| 0482 LDI 0D | C40D | LOAD CARRIAGE RETURN |
| 0484 XPPC 3 | 3F | CALL PUTC |
| 0485 LDI 0A | C40A | LOAD LINE FEED |
| 0487 XPPC 3 | 3F | CALL PUTC |
| 0488 LDI 01 | C401 | |
| 048A XPAL 1 | 31 | SET P1 TO WORD6 |
| 048B LDI E0 | C4E0 | |
| 048D XPAH 1 | 35 | |
| 048E JMP 02 | 9002 | GO TO 0492 |
| 0490 JMP 1E | 901E | GO TO 04B0 |
| 0492 CSA | 06 | |
| 0493 ANI FB | D4FB | INITIALIZE DEVICE FLAG |
| 0495 CAS | 07 | |
| 0496 CSA | 06 | |
| 0497 ORI 04 | DC04 | RESET DEVICE FLAG |
| 0499 CAS | 07 | |
| 049A NOP | 08 | NO OPERATION |
| 049B CSA | 06 | COPY STATUS |
| 049C ANI 10 | D410 | MASK ASENSE |
| 049E JNZ F2 | 9CF2 | IF ASENSE ≠ 0, GO TO 0492 |

-continued

| | | | |
|---|---|---|---|
| 04A0 SCL | 03 | SET CY/L | |
| 04A1 LD00(P1) | C100 | LOAD WORD6 | |
| 04A3 CAI 81 | FC81 | WORD6 - 81 | |
| 04A5 JP 09 | 9409 | IF WORD6 - 81 POSITIVE, GO TO 04B0 | |
| 04A7 SCL | 03 | SET CY/L | |
| 04A8 LDI 7F | C47F | LOAD 7F | |
| 04AA CADO0(P1) | F900 | 7F - WORD6 | |
| 04AC JP 02 | 9402 | IF 7F - WORD6 POSITIVE, GO TO 048B0 | |
| 04AE JMP E2 | 90E2 | GO TO 0492 | |
| 04B0 LDI B7 | C4B7 | | |
| 04B2 XPAL 1 | 31 | SET P1 TO RETURN ADDRESS 03B7 | |
| 04B3 LDI 03 | C403 | | |
| 04B5 XPAH 1 | 35 | | |
| 04B6 JMPO0(P1) | 9100 | RETURN TO 03B8 | |
| 04B8 HALT | 00 | HALT | |

A few additional comments on this program deemed helpful follow. A complete discussion has been given in Sec. V2.2.

The symbol @ used in the instruction 0318 for the first time in the program indicates auto-indexed addressing.

As seen in FIG. 14, the flip-flops 17/1 and 17/2 controlling the state of the DIRECTION and CLOCK signals are set or reset by the outputs of the LO address decoder (device 5). Hence, any memory reference instruction whose effective address equals the address of the respective flip-flop function (see the tables on p. 36 and 37) will result in that function. In the present program the LOAD instruction (auto-indexed) is used throughout, at 03C7 for the first time.

Preparing the device flag for an interrupt requires two steps: In the first step an AND operation between the SC/MP STATUS register contents and the appropriate mask (FB) resets BFLG2 in the STATUS register. In the second step BFLG2 is set by ORing the STATUS with 04. The latter step, as seen in FIG. 16, clocks flip-flop 4 and, hence, ASENSE into the low state. ASENSE serves as the interrupt request.

V.2.4. Machine Code Program

A TTY printout of the program listed in Sec. V.2.3. follows:

We claim:

1. A retro-reflective electro-optical angle measuring system comprising in combination:
   transmitting means for generating a first laser beam;
   a beamsplitter for developing two angularly divergent sub-beams from said first laser beam;
   a mirror system;
   individual sub-beam associated photomultipliers;
   a vibrating mirror disposed in the path of said sub-beams for sweeping said sub-beams across a retro-reflective tape and for re-directing the retro-reflected sub-beams back through said mirror system and upon said respective individual sub-beam associated photomultipliers, said photomultipliers responsive to said sub-beams for providing photomultiplier pulses when said sub-beams cross said retro-reflective tape; and,
   receiving means responsive to the time interval between said photomultiplier pulses for angle measurement between said retro-reflective tape and a reference plane formed by said sweeping sub-beams, the sign of the angle dependent upon the sequence of said sub-beams crossing said retro-reflective tape.

2. In combination in a system including a target and a follower, said target having a retro-reflective film, said

CL 0001
—T0310:04B8

| | | | | | | | | | | | | | | | |
|---|---|---|---|---|---|---|---|---|---|---|---|---|---|---|---|
| 0310 | C4 | 20 | 31 | C4 | 02 | 35 | C4 | 00 | CD | 01 | CD | 1F | C4 | 0F | 32 | C4 |
| 0320 | 03 | 36 | C4 | 90 | 33 | C4 | 7A | 37 | 3F | CD | 01 | 03 | FC | BB | 9C | F8 |
| 0330 | C4 | 20 | C9 | FF | C4 | 00 | C9 | 00 | C4 | 20 | 31 | C4 | 02 | 35 | 03 | A9 |
| 0340 | 00 | FC | 01 | 9C | 08 | C4 | 80 | 31 | C4 | 02 | 35 | 90 | DB | FC | 01 | 9C |
| 0350 | 08 | C4 | C0 | 31 | C4 | 02 | 35 | 90 | CF | C4 | 22 | 31 | C4 | 02 | 35 | 08 |
| 0360 | 08 | C4 | 02 | C9 | 00 | C8 | 7C | C4 | E1 | 33 | C4 | 7A | 37 | C4 | 0D | 3F |
| 0370 | C4 | 0A | 3F | 3F | C4 | 16 | 33 | C4 | 7B | 37 | 3F | 02 | 40 | C4 | B3 |
| 0380 | 33 | C4 | 7B | 37 | C1 | 00 | 3F | C4 | E1 | 33 | C4 | 7A | 37 | C4 | 0D | 3F |
| 0390 | C4 | 0A | 3F | C4 | 16 | 33 | C4 | 7B | 37 | 3F | 02 | 80 | 08 | 08 | C4 | E1 |
| 03A0 | 33 | C4 | 7A | 37 | C4 | 0D | 3F | C4 | 0A | 3F | C4 | 04 | 35 | C4 | 07 |
| 03B0 | C9 | 00 | C4 | 00 | C9 | FF | C9 | FE | C4 | F0 | 31 | C4 | EF | 35 | C1 | 00 |
| 03C0 | D4 | 02 | 9C | 07 | C4 | F0 | 35 | C1 | 06 | 90 | 05 | C4 | F0 | 35 | C1 | 07 |
| 03D0 | C4 | F2 | 33 | C4 | 03 | 37 | 06 | D4 | FB | 07 | 06 | DC | 04 | 07 | 05 | C1 |
| 03E0 | 04 | 8F | 02 | C1 | 05 | C0 | FC | C8 | 02 | 8F | 02 | 90 | F2 | 08 | 8F | 5C |
| 03F0 | 08 | EA | 03 | 33 | C8 | FC | 37 | C8 | FA | C4 | 01 | 31 | C4 | E0 | 35 | 06 |
| 0400 | D4 | FB | 07 | 8F | 50 | 06 | DC | 04 | 07 | 8F | 00 | 06 | D4 | 10 | 98 | 17 |
| 0410 | 03 | C1 | 00 | FC | 80 | 98 | 12 | 90 | 0E | 08 | FC | 80 | 98 | 0B | 90 | 06 |
| 0420 | 00 | 00 | 07 | 23 | 11 | 00 | 01 | 90 | 67 | C4 | 00 | 31 | C4 | F0 | 35 | 02 |
| 0430 | A8 | EF | F4 | E6 | C8 | 07 | 02 | C4 | 00 | FD | 01 | C8 | EA | 08 | 08 | 03 |
| 0440 | C0 | DF | FC | 04 | 9C | E9 | C4 | 00 | C8 | D7 | C4 | E1 | 33 | C4 | 7A | 37 |
| 0450 | C0 | D5 | 9C | 04 | C4 | 2D | 90 | 02 | C4 | 20 | 3F | C4 | B3 | 33 | C4 | 7B |
| 0460 | 37 | C0 | C3 | 3F | C0 | BF | 3F | C0 | BB | 3F | 08 | 08 | 08 | C4 | E1 |
| 0470 | 33 | C4 | 7A | 37 | C4 | 20 | 3F | 03 | A8 | A8 | F8 | A7 | 9C | 0A | C4 | 00 |
| 0480 | C8 | A0 | C4 | 0D | 3F | C4 | 0A | 3F | C4 | 01 | 31 | C4 | E0 | 35 | 90 | 02 |
| 0490 | 90 | 1E | 06 | D4 | FB | 07 | 06 | DC | 04 | 07 | 08 | 06 | D4 | 10 | 9C | F2 |
| 04A0 | 03 | C1 | 00 | FC | 81 | 94 | 09 | 03 | C4 | 7F | F9 | 00 | 94 | 02 | 90 | E2 |
| 04B0 | C4 | B7 | 31 | C4 | 03 | 35 | 91 | 00 | 00 | | | | | | | | follower including means for providing two optical beams, and said follower mounted on a platform for rotation and alignment with respect to said retro-reflective film:

means for providing a measure for the angle between said retro-reflective film and reference plane of the platform of said follower by derivation from the time difference between light pulses returning after retro-reflections from said retro-reflective film disposed on said target; and, means responsive to said time difference between light pulses for controlling rotation of said follower for aligning said follower platform parallel to said retro-reflective film.

3. The invention according to claim 2 wherein means for controlling rotation of said follower is rotation rate programmable.

4. The invention according to claim 2 wherein said film is retro-reflective in any plane.

5. A method for measuring the orientation angle of an object relative to a reference plane comprising the steps of:

disposing retro-reflective means on said object;

providing a pair of laser beams intersecting to form a reference plane;

periodically sweeping jointly said pair of laser beams normal to said reference plane across said retro-reflective means thereby providing flashes of reflected light when light spots are incident upon said retro-reflective means in a simultaneous manner whenever said orientation angle is zero valued and at different times other than in a simultaneous manner whenever said orientation angle is not zero valued; and, recording the time difference $\Delta T$ of the light flashes in a pair of receiver channels corresponding respectively to said pair of laser beams, said time difference $\Delta T$ being a function of the angle between said retro-reflective means and said reference plane.

* * * * *